United States Patent
Zhang et al.

(10) Patent No.: US 11,442,574 B2
(45) Date of Patent: Sep. 13, 2022

(54) TOUCH STRUCTURE AND TOUCH DISPLAY PANEL

(71) Applicants: Chengdu BOE Optoelectronics Technology Co., Ltd., Sichuan (CN); BOE Technology Group Co., Ltd., Beijing (CN)

(72) Inventors: Yuanqi Zhang, Beijing (CN); Yi Zhang, Beijing (CN); Wei Wang, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/199,390

(22) Filed: Mar. 11, 2021

(65) Prior Publication Data

US 2022/0011917 A1  Jan. 13, 2022

(30) Foreign Application Priority Data

Jul. 13, 2020 (CN) .......................... 202010667845.1

(51) Int. Cl.
*G06F 3/044* (2006.01)
*G06F 3/041* (2006.01)

(52) U.S. Cl.
CPC ........ *G06F 3/04164* (2019.05); *G06F 3/0412* (2013.01); *G06F 3/0445* (2019.05); *G06F 3/0446* (2019.05); *G06F 2203/04112* (2013.01)

(58) Field of Classification Search
CPC .. G06F 3/04164; G06F 3/0445; G06F 3/0446; G06F 3/0412; G06F 2203/04112
See application file for complete search history.

(56) References Cited

U.S. PATENT DOCUMENTS

| 2019/0018518 | A1* | 1/2019 | Choi | G06F 3/0446 |
| 2019/0258343 | A1* | 8/2019 | Hwang | G06F 3/0445 |
| 2019/0339818 | A1* | 11/2019 | Rhe | G06F 3/04164 |
| 2020/0243610 | A1* | 7/2020 | Han | H01L 27/3276 |

* cited by examiner

*Primary Examiner* — Towfiq Elahi
(74) *Attorney, Agent, or Firm* — Ling Wu; Stephen Yang; Ling and Yang Intellectual Property

(57) ABSTRACT

A touch structure and a touch display panel are provided. The touch structure includes a first region and a second region. Touch electrodes of the first region are touch electrodes with a flawless contour and touch electrodes of the second region are touch electrodes with a notched contour. The touch electrodes of the first region include first boundary electrodes, and the touch electrodes of the second region include second boundary electrodes. The first boundary electrode includes a first side and the second boundary electrode includes a second side. The first side and the second side are provided with a compensation structure which is configured to form a compensation boundary line between the first side and the second side and the length of the compensation boundary line is greater than the length of a reference boundary line.

19 Claims, 9 Drawing Sheets

TOUCH STRUCTURE AND TOUCH DISPLAY PANEL

CROSS-REFERENCE TO RELATED APPLICATION

The present application claims the priority of Chinese Patent Application No. 202010667845.1 filed to the CNIPA on Jul. 13, 2020, the content of which is incorporated herein by reference.

TECHNICAL FIELD

The present disclosure relates to but is not limited to the field of display technology, in particular to a touch structure and a touch display panel.

BACKGROUND

With the rapid development of display technologies, touch technologies have been applied to various electronic devices. According to their working principles, the touch screens for electronic devices can be divided into capacitive screen, resistive screen, infrared screen, surface acoustic wave screen, electromagnetic screen, vibration wave induction screen and optical induction screen. Among them, capacitive touch screen has the advantages of high sensitivity, long life and high light transmittance and is widely used in various display panels.

In order to achieve a larger screen-to-body ratio, some display panels adopt in-screen hole-digging technology, i.e. configuring a hole-digging area in the effective display area for placing hardware such as a front camera. However, for the display panel integrated with touch technology, the hold-digging area harms the uniformity of touch performance and reduces the touch performance.

SUMMARY

The following is a summary of subject matter described in detail herein. This summary is not intended to limit the protection scope of the claims.

On the one aspect, the present disclosure provides a touch structure including a first region and a second region. Touch electrodes of the first region is touch electrodes with a flawless contour while touch electrodes of the second region is touch electrodes with a notched contour. The touch electrodes of the first region include at least one first boundary electrode which is adjacent to the touch electrode of the second region and at least one first non-boundary electrode which is not adjacent to touch electrodes of the second region. The touch electrodes of the second region include at least one second boundary electrode which is adjacent to the first boundary electrode.

The first boundary electrode includes a first side adjacent to the second boundary electrode, and the second boundary electrode includes a second side adjacent to the first boundary electrode. The first side and the second side are provided with a compensation structure respectively which is configured to form a compensation boundary line between the first side and the second side, a length of the compensation boundary line being greater than a length of a reference boundary line. The reference boundary line is a boundary line formed between one side of a first non-boundary electrode and one side of a touch electrode adjacent to the first non-boundary electrode.

In an exemplary embodiment, the compensation structure includes a first protrusion provided on the first side and a second groove provided on the second side, wherein the first protrusion is arranged in the second groove so that the first side and the second side form a polyline compensation boundary line.

Alternatively, the compensation structure includes a first groove provided on the first side and a second protrusion provided on the second side, wherein the second protrusion is arranged in the first groove so that the first side and the second side form a polyline compensation boundary line.

Alternatively, the compensation structure includes a first protrusion and a first groove provided on the first side and a second protrusion and a second groove provided on the second side, wherein the first protrusion is arranged in the second groove while the second protrusion is arranged in the first groove so that the first side and the second side form a polyline compensation boundary line.

In an exemplary embodiment, the first protrusion is arranged between adjacent first grooves and the second protrusion is arranged between adjacent second grooves.

In an exemplary embodiment, a width of the first protrusion is $1/5$ to $2/3$ of the distance between the adjacent second grooves and a width of the second protrusion is $1/5$ to $2/3$ of the distance between the adjacent first grooves.

In an exemplary embodiment, the quantity of first protrusions on the first side is 1 to 5; the quantity of first grooves on the first side is 1 to 5; the quantity of second protrusions on the second side is 1 to 5; and the quantity of second grooves on the second side is 1 to 5.

In an exemplary embodiment, the shapes of the first protrusion, the second protrusion, the first groove and the second groove include any one or more of the following: triangle, rectangle, trapezoid, semi-circle and semi-ellipse.

In an exemplary embodiment, the side of the first non-boundary electrode and the side of the adjacent touch electrode are provided with a reference protrusion or a reference groove or a reference protrusion and a reference groove to form a polyline reference boundary line.

In an exemplary embodiment, the quantity of first protrusions provided on the first side of the first boundary electrode is greater than the quantity of reference protrusions provided on the side of the first non-boundary electrode. Alternatively, the quantity of first grooves provided on the first side of the first boundary electrode is greater than the quantity of reference grooves provided on the side of the first non-boundary electrode. Alternatively, the quantity of first protrusions and that of first grooves provided on the first side of the first boundary electrode are greater than the quantity of reference protrusions and that of reference grooves provided on the side of the first non-boundary electrode respectively.

In an exemplary embodiment, a height of the first protrusion of the first boundary electrode is greater than a height of the reference protrusion of the first non-boundary electrode. Alternatively, a depth of the first groove of the first boundary electrode is greater than a depth of the reference groove of the first non-boundary electrode. Alternatively, a height of the first protrusion and a depth of the first groove of the first boundary electrode are greater than a height of the reference protrusion and a depth of the reference groove of the first non-boundary electrode respectively.

In an exemplary embodiment, at least one third protrusion is provided on the first protrusion of the first boundary electrode while at least one fourth groove is provided in the second groove of the second boundary electrode, the third protrusion being disposed in the fourth groove.

Alternatively, at least one third groove is provided in the first groove of the first boundary electrode while at least one fourth protrusion is provided on the second protrusion of the second boundary electrode, the fourth protrusion being disposed in the third groove.

Alternatively, at least one third protrusion is provided on the first protrusion of the first boundary electrode and at least one third groove is provided in the first groove of the first boundary electrode while at least one fourth protrusion is provided on the second protrusion of the second boundary electrode and at least one fourth groove is provided in the second groove of the second boundary electrode, the third protrusion being disposed in the fourth groove while the fourth protrusion being disposed in the third groove.

In an exemplary embodiment, a width of the third protrusion is ⅕ to ⅔ of a width of the first protrusion; a width of the fourth protrusion is ⅕ to ⅔ of a width of the second protrusion; a width of the third groove is ⅕ to ⅔ of a width of the first groove; and a width of the fourth groove is ⅕ to ⅔ of a width of the second groove.

In an exemplary embodiment, each first protrusion is provided with 1 to 3 third protrusions; each first groove is provided with 1 to 3 third grooves; each second protrusion is provided with 1 to 3 fourth protrusions; and each second groove is provided with 1 to 3 fourth grooves.

In an exemplary embodiment, the touch structure includes a bridge layer, an insulating layer and a touch layer which are in a stacked arrangement, wherein the touch layer includes a plurality of first touch electrodes and a plurality of first connecting parts arranged alternatively and connected successively along a first direction and a plurality of second touch electrodes arranged at intervals along a second direction and wherein the bridge layer includes connecting bridges connected with adjacent second touch electrodes, the first direction intersecting the second direction.

In an exemplary embodiment, the first boundary electrode is a first touch electrode while the second boundary electrode is a second touch electrode; alternatively the first boundary electrode is a second touch electrode while the second boundary electrode is a first touch electrode, the first touch electrode and the second touch electrode being transparent electrodes or metal mesh units.

On another aspect, the present disclosure also provides a touch display panel including a substrate, a display structure layer disposed on the substrate and a touch structure layer disposed on the display structure layer. The touch structure layer includes any of the above touch structures. The location of the second region corresponds to any one or more of the following locations of the display structure layer: edge region, corner region and mounting hole region.

Other aspects will become apparent after the drawings and the detailed description are read and understood.

BRIEF DESCRIPTION OF DRAWINGS

Drawings are used to provide a further understanding of technical solutions of the present disclosure and form a part of the description to explain the technical solutions of the present disclosure together with embodiments of the present disclosure, which do not constitute any limitation on the technical solutions of the present disclosure. Shapes and sizes of the components in the drawings do not reflect true proportions and only to be used to schematically illustrate contents of the present disclosure.

FIG. 4-1 and FIG. 4-2 are schematic diagrams of touch electrodes with a flawed contour according to exemplary embodiments of the present disclosure.

FIG. 5-1 and FIG. 5-2 are schematic diagrams of boundary electrodes according to exemplary embodiments of the present disclosure.

FIG. 6-1 and FIG. 6-2 are schematic diagrams of a boundary line according to exemplary embodiments of the present disclosure.

FIG. 12-1, FIG. 12-2 and FIG. 12-3 are schematic diagrams of touch electrodes for simulation tests according to exemplary embodiments of the present disclosure.

DETAILED DESCRIPTION

Figure 1:
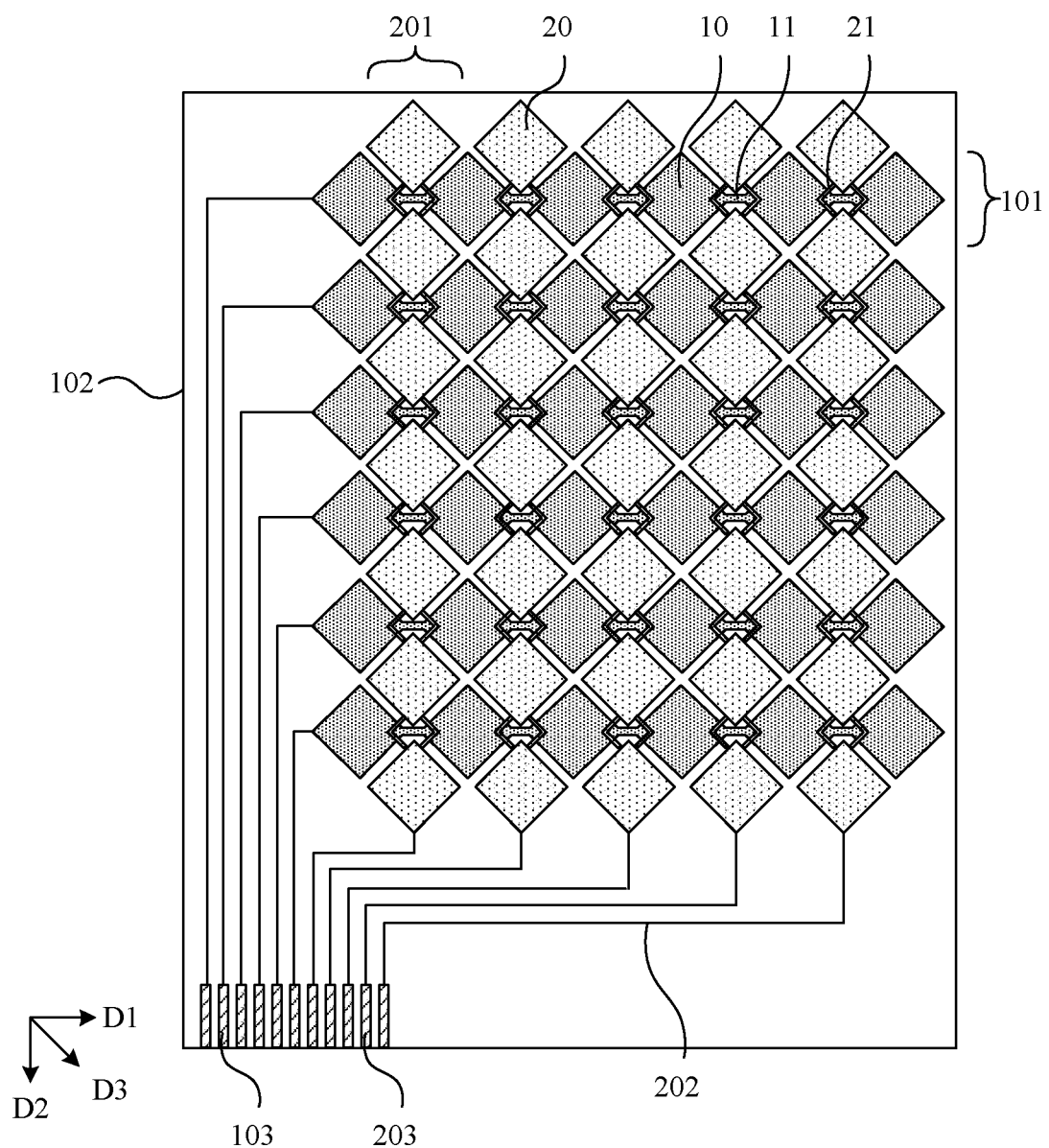
FIG. 1 is a schematic structural diagram of a touch structure layer.

Hereinafter embodiments of the present disclosure will be described in detail with reference to the accompanying drawings. It should be noted that the embodiments may be implemented in a number of different forms. Those of ordinary skills in the art will readily understand the fact that implementations and contents may be transformed into a variety of forms without departing from the spirit and scope of the present disclosure. Therefore, the present disclosure should not be construed as being limited only to what is described in the following embodiments. The embodiments and features in the embodiments in the present disclosure may be combined randomly if there is no conflict.

In the drawings, sizes of constituent elements and thicknesses and areas of layers are sometimes exaggerated for clarity. Therefore, an implementation of the present disclosure is not necessarily limited to the sizes shown. The shapes and sizes of components in the drawings do not reflect true proportions. In addition, the drawings schematically show ideal examples, and an implementation of the present disclosure is not limited to the shapes or values shown in the drawings.

The "first", "second", "third" and other ordinal numbers in the present disclosure are used to avoid confusion of constituent elements, not to provide any quantitative limitation.

In the present disclosure, for the sake of convenience, wordings such as "central", "upper", "lower", "front", "rear", "vertical", "horizontal", "top", "bottom", "inner", "outer" and the others describing the orientations or positional relations are used to depict the relationship of constituent elements with reference to the drawings, which are only for an easy and simplified description of this disclosure, rather than for indicating or implying that the device or element referred to must have a specific orientation, or must be constructed and operated in a particular orientation and therefore, those wordings cannot be construed as limitations on the present disclosure. The positional relations of the constituent elements are appropriately changed according to the direction in which each constituent element is described. Therefore, they are not limited to the wordings in this disclosure and may be replaced appropriately on a case-by-case basis.

In this disclosure, the terms "installed", "connected" and "coupled" shall be understood in their broadest sense unless otherwise explicitly specified and defined. For example, a connection may be a fixed connection, a detachable connection, or an integrated connection; it may be a mechanical connection or an electrical connection; it may be a direct connection, or an indirect connection via middleware, or an internal connection between two elements. Those of ordinary skills in the art can understand the specific meanings of the above mentioned terms in the present disclosure according to specific context.

In the present disclosure, a transistor refers to an element including at least three terminals, namely, a gate electrode, a drain electrode and a source electrode. The transistor has a channel region between the drain electrode (also referred to as a drain terminal, a drain region or a drain electrode) and the source electrode (also referred to as a source electrode terminal, a source region or a source electrode), and current can flow through the drain electrode, the channel region and the source electrode. It should be noted that in the present disclosure, the channel region refers to a region through which the current mainly flows.

In the present disclosure, a first electrode may be a drain electrode while a second electrode may be a source electrode, or a first electrode may be a source electrode while a second electrode may be a drain electrode. The functions of the "source electrode" and that of the "drain electrode" are interchangeable under circumstances where transistors with opposite polarities are used or where the current direction changes during circuit operation. Therefore, in the present disclosure, "the source electrode" and "the drain electrode" can be exchanged with each other.

In this disclosure, "an electrical connection" includes a case where constituent elements are connected via an element having a certain electrical function. The "element having a certain electrical action" is not particularly limited as long as it can transmit and receive electrical signals between connected constituent elements. Examples of the "elements having certain electrical function" include not only electrodes and wiring, but also switching elements such as transistors, resistors, inductors, capacitors, and other elements having various functions.

In the present disclosure, "parallel" refers to a state in which two straight lines form an angle between −10 degrees and 10 degrees and thus, includes a state in which the angle is between −5 degrees and 5 degrees. In addition, "vertical" refers to a state in which two straight lines form an angle between 80 degrees and 100 degrees and thus, includes a state in which the angle is between 85 and 95 degrees.

In the present disclosure, "film" and "layer" are interchangeable. For example, sometimes "conductive layer" may be replaced by "conductive film". Similarly, "insulating film" may sometimes be replaced by "insulating layer".

In the present specification, "about" means that there is not strict limit for a value, and values within an error range during processes and measurement are allowed.

The touch display panel in the present disclosure comprises a display structure layer disposed on a substrate and a touch structure layer disposed on the display structure layer. The display structure layer may be a liquid crystal display structure layer, an organic light emitting diode display structure layer, a plasma display structure layer, or an electrophoretic display structure layer. Organic Light Emitting Diode (OLED) is an active light emitting display component with the advantages of self-illumination, wide viewing angle, high contrast, low power consumption, extremely high response speed, etc. With the continuous development of display technology, display devices with OLED as a light emitting component and Thin Film Transistor (TFT) for implementing signal control have become the mainstream products in the display field.

In an exemplary embodiment, the OLED touch display panel adopts a Flexible Multi-Layer On Cell (FMLOC) structure, and the flexible touch structure layer is disposed on the OLED display structure layer. The OLED touch display panel comprises an OLED display structure layer disposed on a substrate and a touch structure layer disposed on the OLED display structure layer. The touch structure layer is disposed on the encapsulation layer of the display structure layer, which forms a Touch on Thin Film Encapsulation (Touch on TFE) structure.

In an exemplary embodiment, horizontally the OLED display structure layer may include a plurality of pixel units regularly arranged, and each pixel unit may include 3 sub-pixels, 4 sub-pixels or a plurality of sub-pixels. When the pixel unit includes 3 subpixels, the 3 subpixels include a first subpixel emitting light of a first color, a second subpixel emitting light of a second color and a third subpixel emitting light of a third color. When the pixel unit includes 4 subpixels, the 4 subpixels include a first subpixel emitting light of a first color, a second subpixel emitting light of a second color, a third subpixel emitting light of a third color and a fourth subpixel emitting light of a fourth color. In an exemplary embodiment, the light of the first color may be red (r) light; the light of the second color may be green (g) light; the light of the third color may be blue (b) light; and the light of the fourth color may be white (w) light. In an exemplary embodiment, the shape of subpixels may be any one or more of triangle, square, rectangle, rhombus, trapezoid, parallelogram, pentagon, hexagon and other polygons and the subpixels may be arranged in a form of side by side, square, X shape, cross shape, tripod shape (top and twin-side bottom) or the like, to which this disclosure does not provide any limitation.

In an exemplary embodiment, vertically the display structure layer may include a driving circuit layer disposed on a substrate, a light emitting structure layer disposed on the driving circuit layer, and an encapsulation layer disposed on the light emitting structure layer. When the display panel is formed, the touch structure layer is disposed on the encapsulation layer. In some possible implementations, the display structure layer may comprise other film layers and other film layers may also be disposed between the touch structure layer and the encapsulation layer, to which this disclosure does not provide any limit.

In an exemplary embodiment, the substrate may be a rigid substrate or a flexible substrate. A rigid substrate may adopts glass or quartz while a flexible substrate may include a first flexible material layer, a first inorganic material layer, a semiconductor layer, a second flexible material layer and a second inorganic material layer which are stacked, wherein materials of the first flexible material layer and the second flexible material layer may be polyimide (PI), polyethylene terephthalate (PET) or a polymer soft film with surface treatment; materials of the first inorganic material layer and the second inorganic material layer may be silicon nitride (SiNx) or silicon oxide (SiOx), etc., configured for improving the water-resistance and oxygen-resistance of the substrate; and the material of the semiconductor layer can be amorphous silicon (a-si).

In an exemplary embodiment, the driving circuit layer may include a transistor and a storage capacitor which constitute a pixel driving circuit. In some possible implementations, the driving circuit layer of each subpixel may include: a first insulating layer disposed on the flexible substrate, an active layer disposed on the first insulating layer, a second insulating layer covering the active layer, a gate electrode and a first capacitor electrode disposed on the second insulating layer, a third insulating layer covering the gate electrode and the first capacitor electrode, a second capacitor electrode disposed on the third insulating layer, a fourth insulating layer covering the second capacitor electrode. The fourth insulating layer is provided with via holes exposing the active layer and provided with a source electrode and a drain electrode which are connected with the active layer through the via holes, respectively. A planarization layer that covers the aforementioned structure is also included. The active layer, the gate electrode, the source electrode and the drain electrode constitute a transistor, and the first capacitor electrode and the second capacitor electrode constitute a storage capacitor. In some possible implementations, the first insulating layer, the second insulating layer, the third insulating layer and the fourth insulating layer may be made of any one or more of silicon oxide (SiOx), silicon nitride (SiNx) and silicon oxynitride (SiON), and may be single-layer, multi-layered or composite layered. The first insulating layer may be referred to as a Buffer layer, which is configured for improving the water and oxygen resistance capability of the substrate. The second insulating layer and the third insulating layer may be referred to as Gate Insulating (GI) layers. The fourth insulating layer may be referred to as an Interlayer Dielectric (ILD) layer. A first metal thin film, a second metal thin film and a third metal thin film may be made of metal materials, such as any one or more of silver (Ag), copper (Cu), aluminum (Al), titanium (Ti) and molybdenum (Mo), or alloy materials of the above metals, such as aluminum neodymium alloy (AlNd) or molybdenum niobium alloy (MoNb), and may have a single-layered structure or a multi-layered composite structure, such as Ti/Al/Ti, etc. An active layer thin film may be made of materials such as amorphous indium gallium zinc oxide (a-IGZO), zinc oxynitride (ZnON), indium zinc tin oxide (IZTO), amorphous silicon (a-Si), polysilicon (p-Si), hexathiophene, or polythiophene, etc. That is, transistors that are manufactured based on oxide technology, silicon technology or organics technology are applicable to the present disclosure.

In an exemplary embodiment, the light-emitting structure layer may include an anode, a pixel define layer, an organic light-emitting layer and a cathode. The anode is disposed on the planarization layer and is connected with the drain electrode through via holes formed in the planarization layer. The pixel define layer is disposed on the anode and the planarization layer and is provided with a pixel opening exposing the anode. The organic light-emitting layer is disposed in the pixel opening. The cathode is disposed on the organic light-emitting layer. The organic light-emitting layer will emit light of certain color under the action of the voltage applied by the anode and the cathode.

In an exemplary embodiment, the encapsulation layer may include a first encapsulation layer, a second encapsulation layer and a third encapsulation layer which are stacked. The first encapsulation layer and the third encapsulation layer may be made of inorganic materials, and the second encapsulation layer may be made of organic materials. The second encapsulation layer is disposed between the first encapsulation layer and the third encapsulation layer, which can ensure that moisture outside cannot enter the light emitting structure layer.

FIG. 1 is a schematic structural diagram of a touch structure layer. As shown in FIG. 1, horizontally, the touch structure layer includes a plurality of first touch units 101 and a plurality of second touch units 201. Each first touch unit 101 has a line shape extending along a first direction D1 and the plurality of the first touch units are arranged sequentially along a second direction D2. Each second touch unit 201 has a line shape extending along the second direction D2 and the plurality of the second touch units 201 are arranged sequentially along the first direction D1. The first direction D1 intersects the second direction D2.

In an exemplary embodiment, each first touch unit 101 includes a plurality of first touch electrodes 10 and first connecting parts 11 arranged sequentially along the first direction D1, the plurality of the first touch electrodes 10 and the first connecting parts 11 being alternately arranged and successively coupled. Each second touch unit 201 includes a plurality of second touch electrodes 20 arranged sequentially along the second direction D2, the plurality of second touch electrodes 20 being arranged at intervals and the adjacent second touch electrodes 20 being coupled to each other via a second connecting part 21. The second connecting parts 21 are disposed on a different layer from the layers on which the first touch electrodes 10 and the second touch electrodes 20 are disposed. The first touch electrodes 10 and the second touch electrodes 20 are alternately arranged along a third direction D3, the third direction D3 intersecting the first direction D1 and the second direction D2.

In an exemplary embodiment, each first touch unit 101 is coupled to a first bonding pad electrode 103 via a first transmission line 102, and each second touch unit 201 is coupled to a second bonding pad electrode 203 via a second transmission line 202. In an exemplary embodiment, the first touch electrodes 10 are coupled to a driver of the touch display panel via first the bonding pad electrodes 103, and the second touch electrodes 20 are coupled to the driver via the second bonding pad electrodes 203. The driver applies driving signals to the second touch electrodes 20 and receives output signals from the first touch electrodes 10 to form a stable capacitance between the first touch electrodes 10 and the second touch electrodes 20. When a finger touches the touch screen, the touch causes the capacitance between the first touch electrode 10 and the second touch electrode 20 to change so that the location of the touch is determined and touch operation can be correspondingly achieved. In some possible implementations, the driver may apply a driving signal to the first touch electrode 10 and receives an output signal from the second touch electrode 20.

In an exemplary embodiment, vertically the touch structure layer may include a bridge layer, an insulating layer and a touch layer which are stacked. In an exemplary embodiment, a plurality of first touch electrodes 10, a plurality of second touch electrodes 20 and a plurality of first connecting parts 11 may be arranged on the same layer, i.e., the touch layer, and may be formed at the same patterning process. The first touch electrodes 10 and the first connecting parts 11 may be connected as an integral structure. The second connecting part 21 may be arranged on the bridge layer and connect adjacent second touch electrodes 20 through via holes, and an insulating layer is disposed between the touch layer and the bridge layer. In an exemplary embodiment, the second connecting part 21 is refers to as a connecting bridge. In some possible implementations, a plurality of first touch electrodes 10, a plurality of second touch electrodes 20 and a plurality of second connecting parts 21 may be arranged on the same layer, i.e., the touch layer. The second touch electrodes 20 and the second connecting parts 21 may be connected as an integral structure. The first connecting parts 11 may be disposed on the bridge layer and connect adjacent first touch electrodes 10 through via holes. In an exemplary embodiment, the first touch electrodes may be a driving electrode (Tx) while the second touch electrode may be a sensing electrode (Rx); alternatively, the first touch electrode may be a sensing electrode (Rx) while the second touch electrode may be a driving electrode (Tx).

In an exemplary embodiment, the first touch electrode 10 and the second touch electrode 20 may have a rhombic shape, such as a regular rhombic shape, a horizontally long rhombic shape, or a longitudinally long rhombic shape. In some possible implementations, the first touch electrode 10 and the second touch electrode 20 may have shape of any one or more of a triangle, a square, a trapezoid, a parallelogram, a pentagon, a hexagon and other polygons, which is not limited in the present disclosure.

In an exemplary embodiment, the first touch electrode 10 and the second touch electrode 20 may be in the form of a transparent electrode made of transparent conductive materials such as indium tin oxide (ITO) or indium zinc oxide (IZO), and isolated patterns of the first touch electrode 10 and the second touch electrode 20 are formed within a patterning process.

In an exemplary embodiment, the first touch electrode 10 and the second touch electrode 20 may be in the form of a metal mesh unit. Metal mesh is formed by a plurality of interweaving metal wires, and the metal mesh includes a plurality of mesh unit patterns, each of the mesh unit patterns is a polygon formed with a plurality of metal wires. The first touch electrode 10 and the second touch electrode 20 are in the form of metal mesh unit, which has the advantages of low resistance, thin thickness, fast response speed, lightness and foldability, etc. In an exemplary embodiment, the region formed by metal wires in a mesh unit pattern contains the region of a subpixel in the display structure layer, the metal wires being located between adjacent subpixels. For example, when the display structure layer is an OLED display structure layer, the region of a subpixel can be the light-emitting region defined by a pixel define layer in the light-emitting structure layer. The region enclosed by the metal wires of each mesh unit pattern contains the light-emitting region, the metal wires being located in the corresponding positions on the pixel define layer, i.e., in the non-light-emitting region. In an exemplary embodiment, the shape of a mesh unit pattern formed by the metal wires may include any one or more of a triangle, a square, a rectangle, a rhombus, a trapezoid, a pentagon and a hexagon. In some possible implementations, the shape of a mesh unit pattern formed by the metal wires may be regular or irregular, and a side of a mesh unit pattern can be a straight line or a curve, to which this disclosure does not provide any limitation. In some possible implementations, the line width of the metal wires is ≤5 μm.

Figure 2:
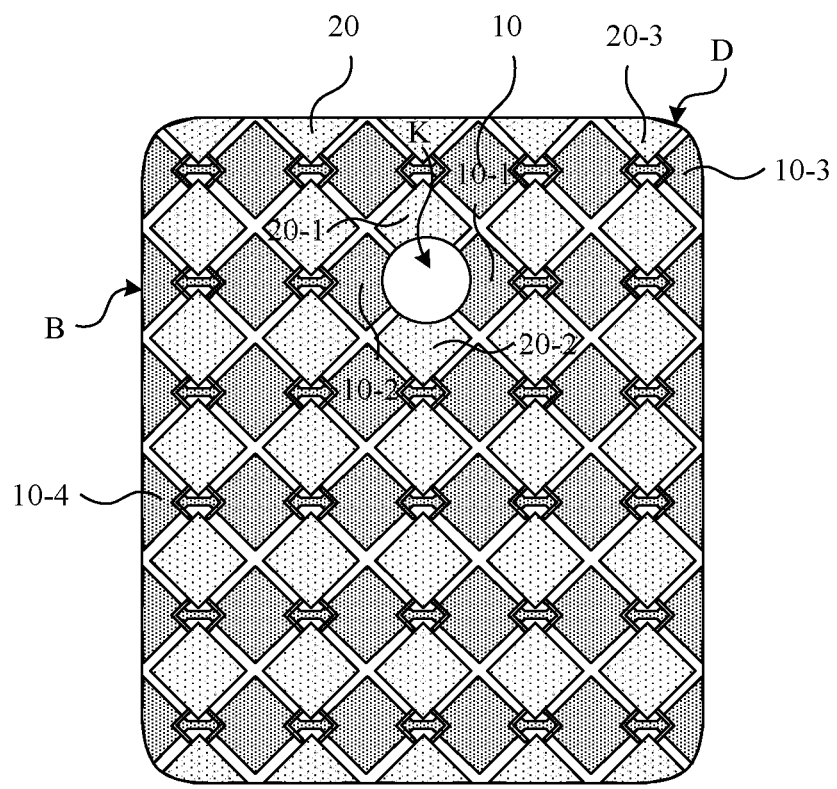
FIG. 2 is a schematic diagram of a touch electrode with a flawed contour.

In order to meet the needs of various products, some OLED display structure layers are specially designed, which cause the contour of the touch electrode in the touch structure layer to be incomplete. For example, in order to obtain a full screen, some OLED display structure layers are arranged mounting holes in the Active Area (AA), and the mounting holes are configured for the mounting of hardware such as front cameras. For another example, in order to achieve narrow borders and smooth corners, the edges and the four corners of some OLED display structure layers are designed to be special-shaped. FIG. 2 is a schematic diagram of touch electrodes with notched contours. As shown in FIG. 2, the mounting hole K in the touch structure layer causes the contours of a plurality of touch electrodes adjacent to the mounting holes K such as touch electrode 10-1, touch electrode 10-2, touch electrode 20-1 and touch electrode 20-2 to become notched and the shapes thereof to be incomplete. The rounded corner D in the touch structure layer causes the contours of a plurality of touch electrodes adjacent to the rounded corner D such as touch electrode 10-3 and touch electrode 20-3 to become notched and the shapes thereof to be incomplete. The narrow edge B in the touch structure layer causes the contours of a plurality of touch electrodes 10-4 adjacent to the narrow side B to become notched and the shapes thereof to be incomplete. Therefore, the special designs of OLED display structure layer causes the shapes of touch electrodes at some positions of the touch structure layer to be different from the designed shapes and compromise the completeness of the designed shapes, which causes the mutual capacitance values of the touch electrodes with a notched contour to decrease and a large difference from the mutual capacitance values of the touch electrodes with flawless contours, and thus, the uniformity of touch performance is poor, which reduces touch performance.

A simulation study of a touch structure layer shows that in the central area where the contour of a touch electrode is not notched, the mutual capacitance value Cm of the touch electrodes is about 1.30 pF to 1.35 pF. In the edge area where the contour of a touch electrode is notched, the mutual capacitance value Cm of the touch electrodes is about 1.20 pF to 1.25 pF, decreasing by about 10%. In the corner area where the contour of the touch electrode is notched, the mutual capacitance value Cm of the touch electrode is about 0.90 pF to 0.93 pF, decreasing by about 40%. In the mounting hole area where the contour of the touch electrode is notched, the mutual capacitance value Cm of the touch electrodes is about 0.90 pF to 0.93 pF, decreasing by about 40%. A further simulation shows that in the area where the contour of a touch electrode is notched, the tolerance value ΔCm also decreases by about 10%. The tolerance value ΔCm refers to the difference between the mutual capacitance value between the driving electrode and the sensing electrode when there is no finger touch and the mutual capacitance between the driving electrode and the sensing electrode when there is finger touch. Although the Touch IC can to some extent provide some compensation with algorithm for partial touch electrodes whose shape integrity is compromised, the compensation is limited and can hardly meet the requirement for uniformity and furthermore the Touch IC sacrifices other performances like power consumption to provide the compensation.

Figure 3:
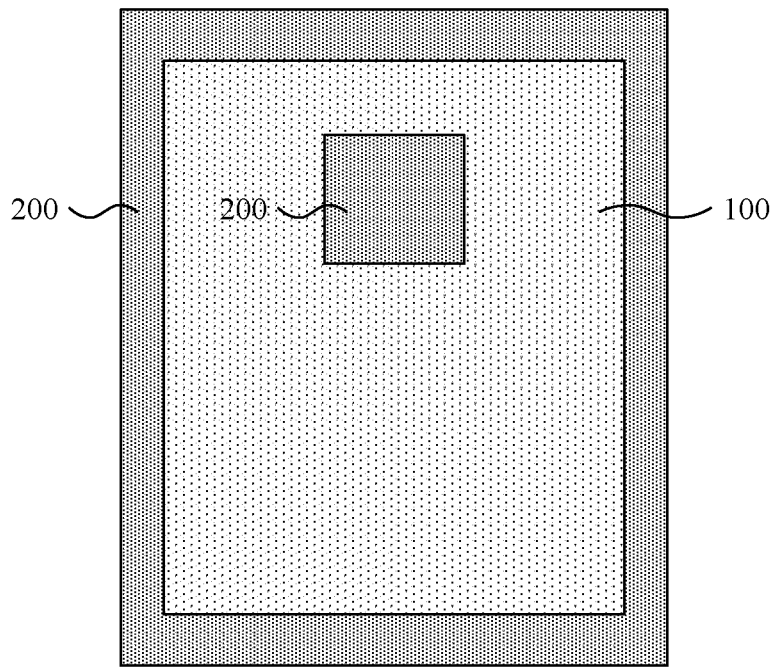
FIG. 3 is a schematic plan of a touch structure layer according to the present disclosure.

FIG. 3 is a schematic plan of a touch structure layer according to the present disclosure. As shown in FIG. 3, in an exemplary embodiment, the touch structure layer includes a first region 100 and a second region 200, wherein all touch electrodes of the first region 100 are touch electrodes with flawless contours while all touch electrodes of the second region 200 are touch electrodes with notched contours. That is to say, the first region 100 is a region where touch electrodes with flawless contours are located, comprising a plurality of touch electrodes with flawless contours, while the second region 200 is a region where touch electrodes with notched contours are located, comprising at least one touch electrode with a notched contour. In an exemplary embodiment, the second region 200 may be located in edges or corners of the first region 100, corresponding to the positions of the edges and four corners of the display structure layer. In an exemplary embodiment, the second region 200 may be located inside the first region 100, corresponding to the positions of the mounting holes of the display structure layer. In an exemplary embodiment, the second region 200 may be located at any position and may have any shape, such as a rectangle, a circle, an ellipse and an annulus, to which this disclosure does not provide any limitation.

In an exemplary embodiment of the present disclosure, a touch electrode with a flawless contour means that the contour of the touch electrode is the same as the designed contour. A touch electrode with a notched contour means that the contour of the touch electrode is different from the designed contour and the designed shape is damaged. In an exemplary embodiment, the region where the touch electrodes are located can be provided with one or more dummy regions and the touch electrodes with dummy regions are still regarded as the touch electrodes with a flawless contour.

Figures 1, 4:
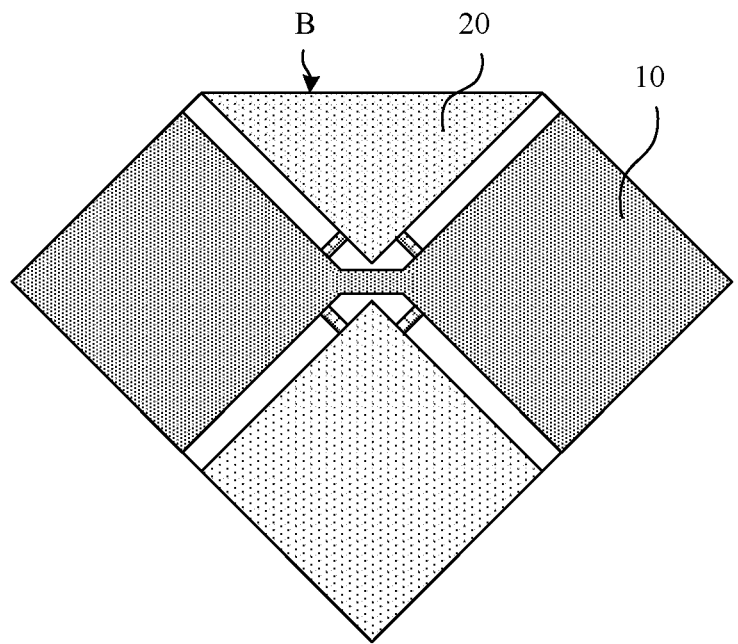
Figures 2, 4:
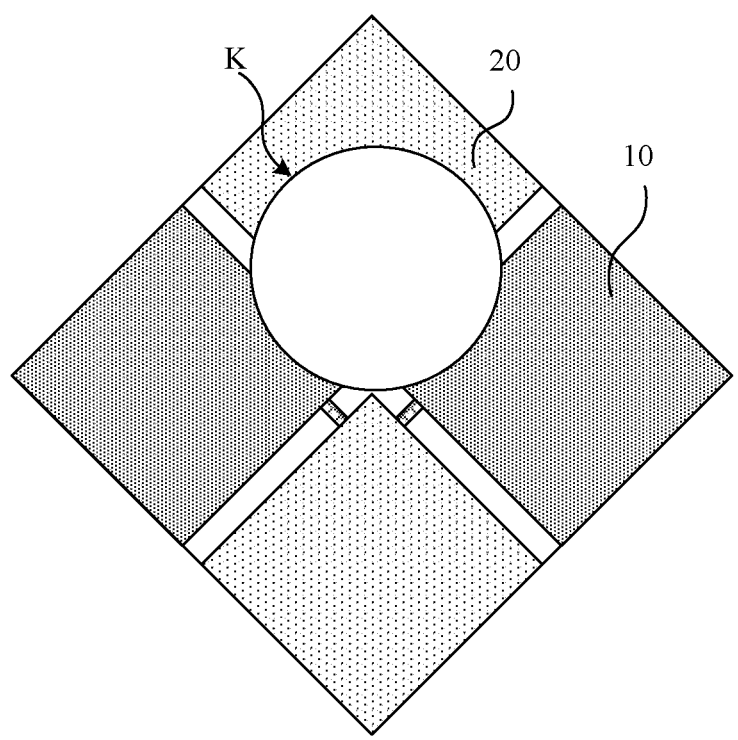

FIG. 4-1 is a schematic diagram of a touch electrode with a notched contour according to an exemplary embodiment of the present disclosure. The first touch electrode 10 and the second touch electrode 20 are designed to be in a rhombic shape. FIG. 4-1 shows two first touch electrodes 10 and two second touch electrodes 20, wherein, because of the upper edge, the upper second touch electrode 20 is in a triangular shape which is different from the rhombic shape as designed and has a notched contour. Thus, the upper second touch electrode 20 is a touch electrode with a notched contour and is a touch electrode in the second region 200. While the lower second touch electrode 20 and the two first touch electrodes 10 having rhombic shapes with flawless contours are touch electrodes of the first region 100.

FIG. 4-2 is a schematic diagram of another touch electrode with a notched contour according to an exemplary embodiment of the present disclosure, the first touch electrode 10 and the second touch electrode 20 being designed to be in a rhombic shape. FIG. 4-2 shows two first touch electrodes 10 and two second touch electrodes 20, wherein, because of the mounting hole, the upper second touch electrode 20 and the two first touch electrodes 10 are made different from the shape as designed and have a notched contour and thus, the upper second touch electrode 20 and the two first touch electrodes 10 are touch electrodes with notched contours and belong to touch electrodes of the second region 200; while the lower second touch electrode 20 has a flawless contour and thus it is a touch electrode of the first region 100.

In an exemplary embodiment, the first region 100 may include a plurality of touch electrodes with flawless contours which include first touch electrodes and second touch electrodes. The second region may include at least one touch electrode with a notched contour which may be a first touch electrode or a second touch electrode.

Figures 1, 5:
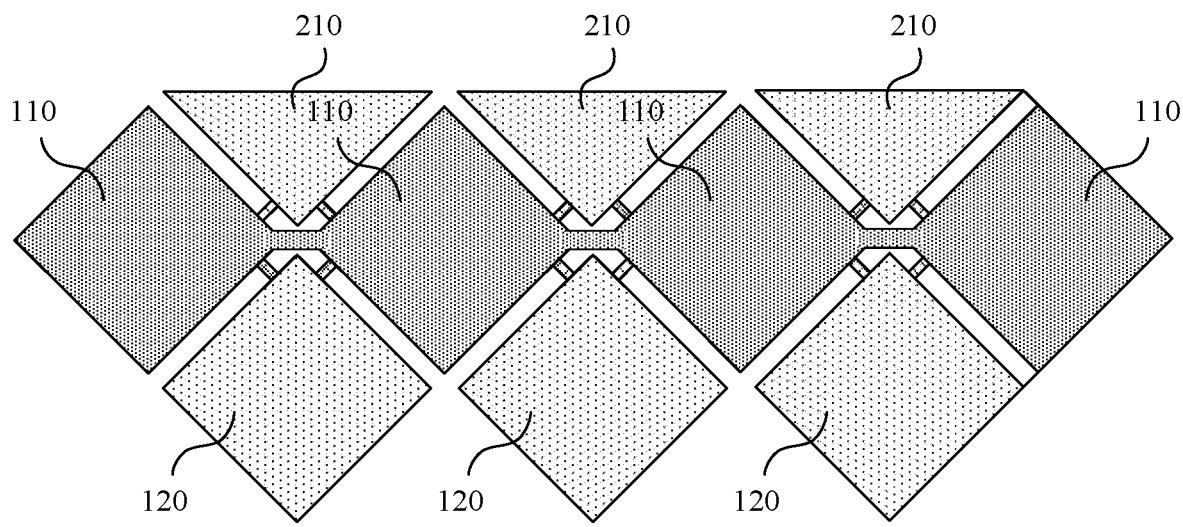
Figures 2, 5:
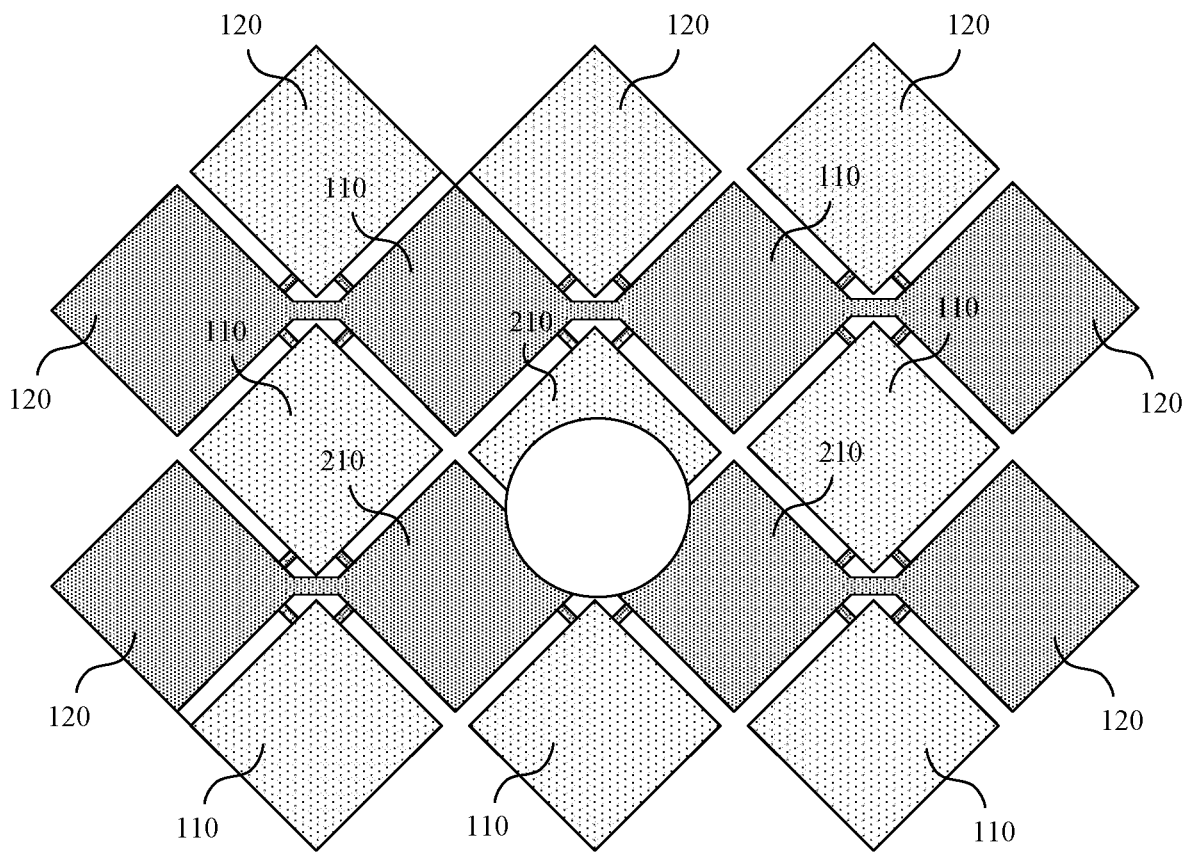

FIG. 5-1 and FIG. 5-2 are schematic diagrams of boundary electrodes according to exemplary embodiments of the present disclosure. The touch electrodes with a flawless contour of the first region 100 include a plurality of touch electrodes which are not adjacent to the touch electrodes of the second region 200 and at least one touch electrode which is adjacent to the touch electrodes of the second region 200. The touch electrodes with a notched contour in the second region 200 include at least one touch electrode which is adjacent to the touch electrodes in the first region 100 and may not include a touch electrode which is not adjacent to the touch electrodes of the first region 100; or may comprise at least one touch electrode which is not adjacent to the touch electrodes in the first region 100. In an exemplary embodiment of the present disclosure, a touch electrode of the first region 100 which is adjacent to the touch electrodes of the second region 200 is referred to as a first boundary electrode 110; while a touch electrode which is not adjacent to the touch electrodes in the second region 200 is referred to as a first non-boundary electrode 120. A touch electrode in the second region 200 which is adjacent to the first boundary electrode 110 in the first region 100 is referred to as a second boundary electrode 210; while a touch electrode which is not adjacent to the first boundary electrode 110 in the first region 100 is referred to as a second non-boundary electrode.

As shown in FIG. 5-1, the three upper touch electrodes are touch electrodes of the second region 200 (touch electrodes with a notched contour), which are adjacent to the touch electrodes of the first region 100 and thus, the three upper touch electrodes are second boundary electrodes 210. The four touch electrodes in the middle are touch electrodes of the first region 100 (touch electrodes with a flawless contour) which are adjacent to the second boundary electrodes 210 and thus, the four touch electrodes in the middle are first boundary electrodes 110. The three lower touch electrodes are not adjacent to the second boundary electrodes 210 and thus, the three lower touch electrodes are first non-boundary electrodes 120.

As shown in FIG. 5-2, the three touch electrodes near the mounting hole are touch electrodes of the second region 200 (touch electrodes with a notched contour) which are adjacent to the touch electrodes of the first region 100 and thus, the three touch electrodes near the mounting hole are second boundary electrodes 210. Other touch electrodes of the first region 100 includes the first boundary electrodes 110 adjacent to the second boundary electrodes 210 and the first non-boundary electrodes 120 not adjacent to the second boundary electrodes 210.

In an exemplary embodiment, a first boundary electrode 110, a second boundary electrode 210, a first non-boundary electrode 120 and a second non-boundary electrode may be a first touch electrode or a second touch electrode; among a first boundary electrode 110 and a second boundary electrode 210 adjacent to each other, one is a first touch electrode and the other is a second touch electrode.

Figures 1, 6:
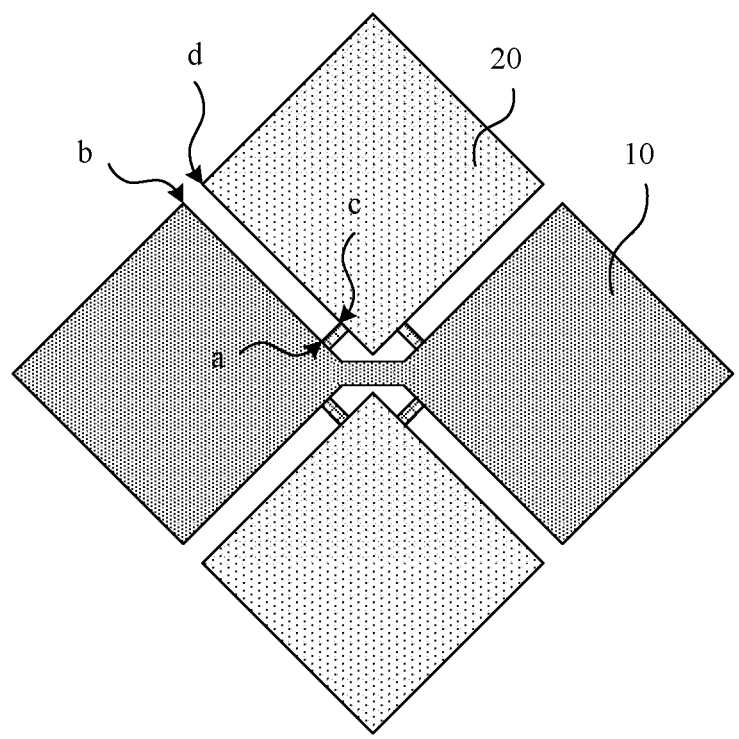
Figures 2, 6:
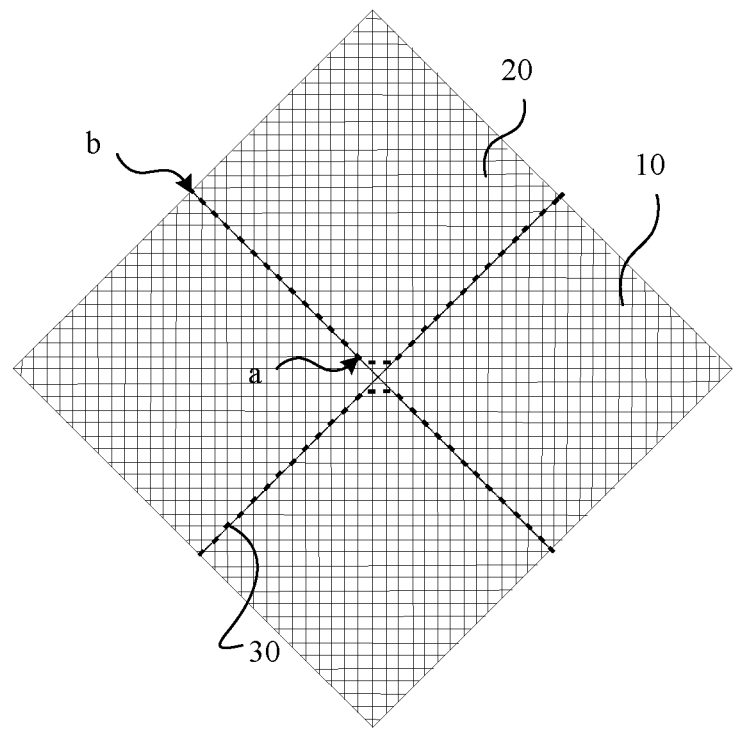

FIG. 6-1 is a schematic diagram of a boundary line according to an exemplary embodiment of the present disclosure, illustrating the boundary line of four touch electrodes of the first region, the touch electrodes are in a form of transparent electrodes. As shown in FIG. 6-1, the four touch electrodes are rhombic, and the sides of the rhombuses are straight lines. In the exemplary embodiment, the upper and lower touch electrodes are second touch electrodes 20 while the left and right touch electrodes are first touch electrodes 10. Between the first touch electrodes 10 and the second touch electrodes 20, there is a gap for achieving insulation between the first touch electrodes 10 and the second touch electrodes 20. In the exemplary embodiment, each side of the first touch electrode 10 is adjacent to the second touch electrode 20, and each side of the second touch electrode 20 is adjacent to the first touch electrode 10. The side of the first touch electrode 10 is parallel to the side of the adjacent second touch electrode 20, forming a straight boundary line. Taking the boundary line between the left first touch electrode 10 and the upper second touch electrode 20 as an example, since the boundary line between the left first touch electrode 10 and the upper second touch electrode 20 includes a line segment ab, the length of the boundary line between the first touch electrode 10 and the second touch electrode 20 is the length of the line segment ab. Alternatively, since the boundary line between the upper second touch electrode 20 and the left first touch electrode 10 includes a line segment cd, the length of the boundary line between the second touch electrode 20 and the first touch electrode 10 is the length of the line segment cd. In the exemplary embodiment, the length of the line segment ab may be equal to the length of the line segment cd.

FIG. 6-2 is a schematic diagram of another boundary line in an exemplary embodiment of the present disclosure, illustrating the boundary lines of four touch electrodes of the first region, the touch electrodes being in the form of metal mesh unit and the pattern of the mesh unit being in a rhombic shape. As shown in FIG. 6-2, in order to insulate the first touch electrodes 10 from the second touch electrodes 20, the metal mesh is provided with a plurality of cuts 30 which disconnect the metal wires of the mesh unit patterns to achieve the isolation of the mesh unit patterns of the first touch electrodes 10 from the mesh unit patterns of the second touch electrodes 20. FIG. 6-2 illustrates a cut 30 with a black block and the cut can be understood as an imaginary line cutting a metal wire. The four rhombic touch electrodes thus are formed, the upper and lower touch electrodes being second touch electrodes 20 and the left and right touch electrodes being first touch electrodes 10. The mesh unit patterns of the first touch electrodes 10 and the mesh unit patterns of the second touch electrodes 20 are insulated from each other by a plurality of cuts disconnecting the metal wires. Since the metal wires on both sides of each cut are adjacent, each side of the first touch electrode 10 in the form of metal mesh is adjacent to the second touch electrode 20 in the form of metal mesh; while each side of the second touch electrode 20 in the form of metal mesh is adjacent to the first touch electrode 10 in the form of metal mesh, the boundary line formed between the first touch electrode 10 and the second touch electrode 20 is an almost straight boundary line of whose length is the length of line segment ab.

In the exemplary embodiment, since all touch electrodes of the first region are touch electrodes with flawless contours, each first touch electrode 10 has the same contour shape and each second touch electrode 20 has the same contour shape and thus, the shape and length of the boundary line between each first touch electrode 10 and second touch electrode 20 of the first region are the same. In an exemplary embodiment of the present disclosure, in the first region, a boundary line formed between a first non-boundary electrode 120 and one side of an adjacent touch electrode is referred to as a reference boundary line. That is to say, in the first region, the boundary line between one side of the first touch electrode 10 and one side of the adjacent second touch electrode 20 is referred to as a reference boundary line.

As shown in FIG. 5-1 and FIG. 5-2, a boundary region is existing between the first region 100 and the second region 200, which includes a plurality of first boundary electrodes 110 and a plurality of second boundary electrodes 210, each first boundary electrode 110 being adjacent to at least one second boundary electrode 210 or each second boundary electrode 210 being adjacent to at least one first boundary electrode 110. In the exemplary embodiment, for a first boundary electrode 110 and a second boundary electrode 210 adjacent to each other, the side of the first boundary electrode 110 adjacent to the second boundary electrode 210 is referred to as a first side, and the side of the second boundary electrode 210 adjacent to the first boundary electrode 110 is referred to as a second side. In the exemplary embodiment, the first side and the second side are provided with a compensation structure configured to form a compensation boundary line between the first side and the second side, and the length of the compensation boundary line is greater than the length of the reference boundary line. The reference boundary line is a boundary line formed between one side of the first non-boundary electrode 120 and one side of the adjacent touch electrode.

In an exemplary embodiment, the compensation structure may include a first protrusion arranged on the first side and a second groove arranged on the second side, wherein the first protrusion is arranged in the second groove so that the first side and the second side interdigitate to form a ployline compensation boundary line.

In an exemplary embodiment, the compensation structure may include a first groove arranged on the first side and a second protrusion arranged on the second side, wherein the second protrusion is arranged in the first groove so that the first side and the second side interdigitate to form a ployline compensation boundary line.

In an exemplary embodiment, the compensation structure may include a first protrusion and a first groove arranged on the first side and a second protrusion and a second groove arranged on the second side, wherein the first protrusion is arranged in the second groove while the second protrusion is arranged in the first groove so that the first side and the second side are interdigitate to form a ployline compensation boundary line.

Figure 7:
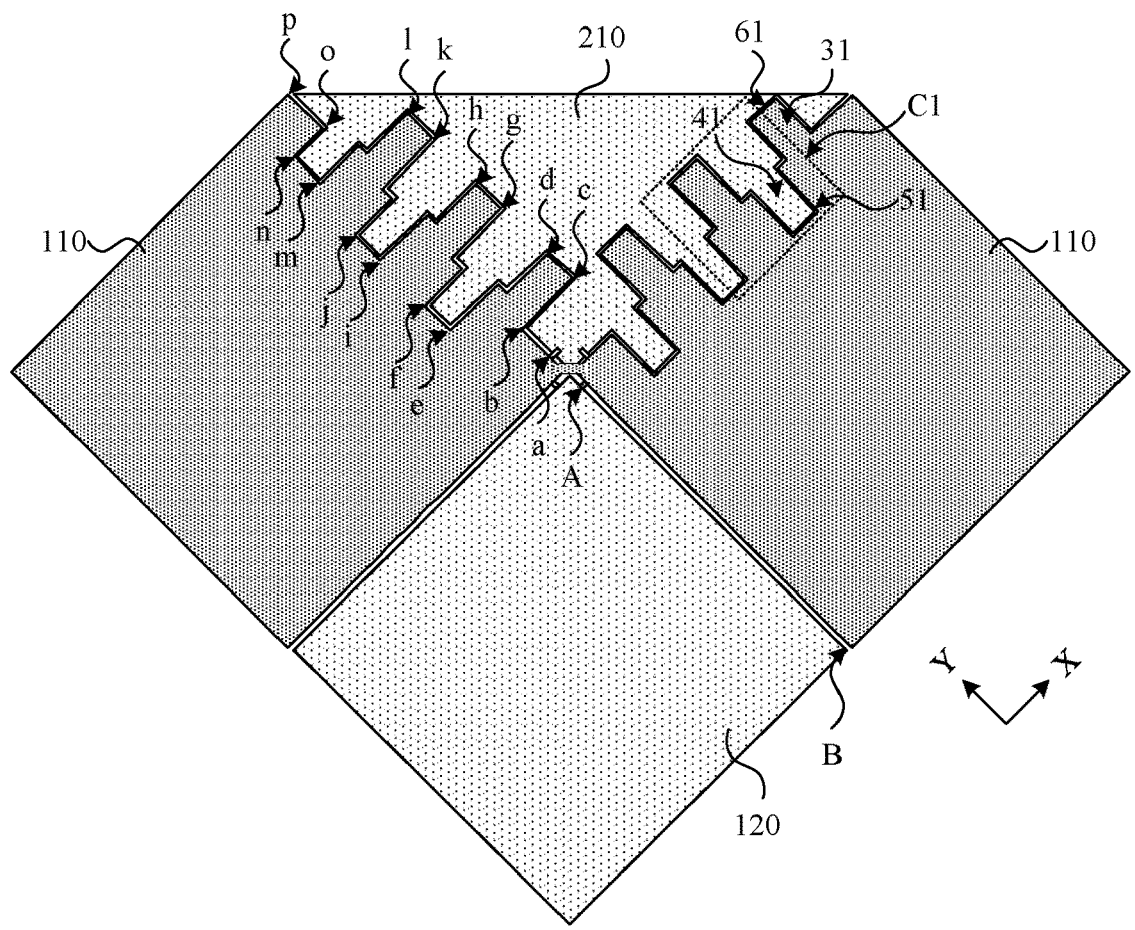
FIG. 7 is a schematic diagram of a compensation boundary line according to an exemplary embodiment of the present disclosure.

FIG. 7 is a schematic diagram of a compensation boundary line according to an exemplary embodiment of the present disclosure. The second boundary electrode is located at the upper edge of the touch structure layer, and the first boundary electrode and the second boundary electrode are in the form of transparent electrodes. As shown in FIG. 7, the first region includes two first boundary electrodes 110 and one first non-boundary electrode 120, wherein the first boundary electrodes 110 and the first non-boundary electrode 120 are in a rhombic shape as designed and are touch electrodes with a flawless contour. The second region is located at the edge of the touch structure layer and includes a second boundary electrode 210. The second boundary electrode 210 is in a triangular shape which is different from the designed rhombic shape and the contour is notched about 50%.

In the exemplary embodiment, the first non-boundary electrode 120 of the first region is adjacent to the two first boundary electrodes 110 of the first region but not adjacent to the second boundary electrode 210 of the second region. A straight boundary line is formed between one side of the first non-boundary electrode 120 and one side of the first boundary electrode 110, the length of the boundary line being the length of the line segment AB and thus, the length L0 of the reference boundary line is equal to the length of the line segment AB.

In the exemplary embodiment, the second boundary electrode 210 of the second region is adjacent to the two first boundary electrodes 110 of the first region to form two boundary lines, i.e. one boundary line is formed by one side of the second boundary electrode 210 and one first boundary electrode 110, the other boundary line is formed by the other side of the second boundary electrode 210 and the other first boundary electrode 110. In an exemplary embodiment, a side of the first boundary electrode 110 is referred to as a first side, and a side of the second boundary electrode 210 is referred to as a second side.

In an exemplary embodiment, a compensation structure may include at least one first protrusion 31 and at least one first groove 51 provided on the first side, and at least one second protrusion 41 and at least one second groove 61 provided on the second side. The first protrusion 31 extends from the first side toward the second boundary electrode 210 (towards a direction away from the first boundary electrode 110); while the first groove 51 extends from the first side toward the inside of the first boundary electrode 110 so that the first side forms a concave-convex polyline. The second protrusion 41 extends from the second side toward the first boundary electrode 110 (towards a direction away from the second boundary electrode 210); while the second groove 61 extends from the second side toward the inside of the second boundary electrode 210 so that the second side forms a concave-convex polyline. The first protrusion 31 is arranged in the second groove 61 while the second protrusion 41 is arranged in the first groove 51 so that the first side and the second side interdigitate with each other, forming a polyline compensation boundary line.

In an exemplary embodiment, the quantity of the first protrusions 31 on the first side is the same as that of the second grooves 61 on the second side, and the shape of the first protrusions 31 on the first side and that of the second grooves 61 on the second side may be the same or similar. The quantity of the second protrusions 41 on the second side is the same as that of the first grooves 51 on the first side, and the shape of the second protrusions 41 on the second side and that of the first grooves 51 on the first side may be the same or similar.

In an exemplary embodiment, the shape of the first protrusion 31 and the shape of the second protrusion 41 may be the same or different. The shape of the first groove 51 and the shape of the second groove 61 may be the same or different.

In an exemplary embodiment, when the shape of the first protrusion 31 is the same as that of the second protrusion 41, the dimensions of the first protrusion 31 and the dimensions of the second protrusion 41 may be the same or different. When the shape of the first groove 51 is the same as that of the second groove 61, the dimensions of the first groove 51 and the dimensions the second groove 61 may be the same or different.

In an exemplary embodiment, horizontally, the shape of the first protrusion 31, the second protrusion 41, the first groove 51 and the second groove 61 may include any one or more of the following: a triangle, a rectangle, a trapezoid, a polygon, a semi-circle and a semi-ellipse, and the sides of the polygon can be straight lines or curves.

In an exemplary embodiment, the first protrusions 31 on the first side may be arranged between adjacent first grooves 51; alternatively, the first grooves 51 on the first side may be arranged between adjacent first protrusions 31. The second protrusions 41 on the second side may be arranged between adjacent second grooves 61; alternatively, the second grooves 61 on the second side may be arranged between adjacent second protrusions 41.

In an exemplary embodiment, the quantity of first protrusions 31 on the first side may be about 1 to 5; the quantity of first grooves 51 on the first side may be about 1 to 5; the quantity of second protrusions 41 on the second side may be about 1 to 5; and the quantity of second grooves 61 on the second side may be about 1 to 5. In some possible implementations, the quantity of first protrusions 31 on the first side may be about 2 to 4; the quantity of first grooves 51 on the first side may be about 2 to 4; the quantity of second protrusions 41 on the second side may be about 2 to 4; and the quantity of second grooves 61 on the second side may be about 2 to 4.

As shown in FIG. 7, taking the compensation boundary line formed between the left first boundary electrode 110 and the upper second boundary electrode 210 as an example, the compensation boundary line formed between the first protrusion 31 and the first groove 51 of the first boundary electrode 110 and between the second protrusion 41 and the second groove 61 of the second boundary electrode 210 include the following line segments: line segment ab, line segment bc, line segment cd, line segment de, line segment ef, line segment fg, line segment gh, line segment hi, line segment ij, line segment jk, line segment kl, line segment lm, line segment mn, line segment no and line segment op. Therefore, the length L of the compensation boundary line between the first boundary electrode 110 and the second boundary electrode 210 is the sum of the lengths of these line segments, i.e. the length of compensation boundary line L=length of line segment ab+length of line segment bc+length of line segment cd+length of line segment de+length of line segment ef+length of line segment fg+length of line segment gh+length of line segment hi+length of line segment ij+length of line segment jk+length of line segment kl+length of line segment lm+length of line segment mn+length of line segment no+length of line segment op.

In an exemplary embodiment, the sum of the lengths of line segments ab, cd, ef, gh, ij, kl, no and op is about the length of line segment AB. Therefore, the length L of compensation boundary line between the first boundary electrode 110 and the second boundary electrode 210 is larger than the length $L_0$ of reference boundary line, and the difference between the length L of compensation boundary line and the length $L_0$ of reference boundary is about the sum of the lengths of line segments bc, de, fg, hi, jk, lm and mn.

According to the exemplary embodiment of the present disclosure, through the compensation structure is provided on the sides of the first and second boundary electrodes, the shape of the compensation boundary line formed between the first and second boundary electrodes is adjusted, so that the length of the compensation boundary line between the first and second boundary electrodes is increased and the contact area between the first and second boundary electrodes is increased, which improves the mutual capacitance value and tolerance value of touch electrodes with a notched contour, and thereby the mutual capacitance value and tolerance value of touch electrodes with a notched contour are almost consistent to those of touch electrodes with a flawless contour, and thus, the touch performance is enhanced.

Figure 8:
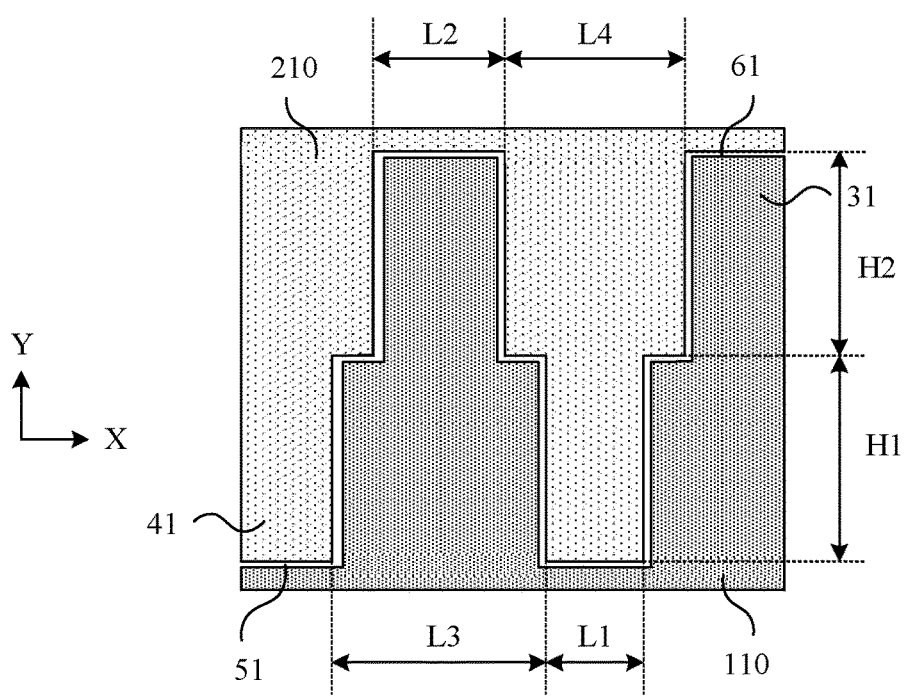
FIG. 8 is a schematic diagram of a compensation structure according to an exemplary embodiment of the present disclosure.

FIG. 8 is a schematic diagram of a compensation structure according to an exemplary embodiment of the present disclosure, which is an enlarged view of C1 area in FIG. 7. As shown in FIG. 8, the first side of the first boundary electrode 110 is provided with a first protrusion 31 and a first groove 51 and the second side of the second boundary electrode 210 is provided with a second protrusion 41 and a second groove 61. The first protrusion 31, the second protrusion 41, the first groove 51 and the second groove 61 have the same shape and are rectangular. The first protrusion 31 is arranged in the second groove 61 while the second protrusion 41 is arranged in the first groove 51 so that the first boundary electrode 110 and the second boundary electrode 210 interdigitate and their sides engaged with each other to form a polyline compensation boundary line.

In an exemplary embodiment, the first protrusion 31 and the second protrusion 41 have the same length and width, and the first groove 51 and the second groove 61 have the same length and width. In the X direction, the widths of the first protrusion 31 and the second protrusion 41 are L1, and the widths of the first groove 51 and the second groove 61 are L2. In the y direction, the heights of the first protrusion 31 and the second protrusion 41 are H1, and the depths of the first groove 51 and the second groove 61 are H2. In an exemplary embodiment, the X direction may be the extending direction of the boundary line, and the Y direction is the direction perpendicular to the X direction.

In an exemplary embodiment, H1=H2 may be configured. In some possible implementations, H1>H2 or H1<H2 may be configured. In an exemplary embodiment, the maximum height of the first protrusion 31 and that of the second protrusion 41 are about the height of 4 to 5 subpixels.

In an exemplary embodiment, L1<L2 may be configured to form an interval between the first protrusion 31 and the second groove 61 and between the second protrusion 41 and the first groove 51 so as to achieve insulation of the first boundary electrode 110 from the second boundary electrode 210. In an exemplary embodiment, the minimum width of the first protrusion 31 and that of the second protrusion 41 is about the width of 1 to 2 subpixels.

As shown in FIG. 8, the first protrusion 31 is arranged between adjacent first grooves 51, and the second protrusion 41 is arranged between adjacent second grooves 61. Alternatively, the first groove 51 is arranged between adjacent first protrusions 31, and the second groove 61 is arranged between adjacent second protrusions 41. A distance between adjacent first protrusions 31 and between adjacent second protrusions 41 is L3, and a distance between adjacent first grooves 51 and between adjacent second grooves 61 is L4. In an exemplary embodiment, L1=(⅕ to ⅔) L4 and L2=(⅕ to ⅔) L3 may be configured. The area formed between adjacent first grooves 51 and that formed between adjacent second grooves 61 are equivalent to a boss and thus, the first protrusion 31 and the second protrusion 41 can be understood as protrusions formed on the boss, L4 being the width of the boss, L1 being the width of the protrusion, and L1, the width of the protrusion, being ⅕ to ⅔ of L4, the width of the boss. The area formed between adjacent first protrusions 31 and that formed between adjacent second protrusions 41 are equivalent to a recess and thus, the first groove 51 and the second groove 61 can be understood as grooves formed in the recess, L3 being the width of the recess, L2 being the width of the groove, and L2, the width of the groove, being ⅕ to ⅔ of L3, the width of the recess.

Although FIG. 8 illustrates it by the example of a plurality of first protrusions and first grooves provided on the first boundary electrode 110 and a plurality of second protrusions and second grooves provided on the second boundary electrode 210, the present disclosure is not limited to the structure. In an exemplary embodiment, the first boundary electrode 110 may be provided with only one or with more than one first protrusions, and the second boundary electrode 210 may be provided with only one or with more than one second grooves, the first protrusions being arranged in the second grooves. In another exemplary embodiment, the first boundary electrode 110 may be provided with only one or with more than one first grooves, and the second boundary electrode 210 may be provided with only one or with more than one second protrusions, the second protrusions being arranged in the first grooves.

Figure 9:
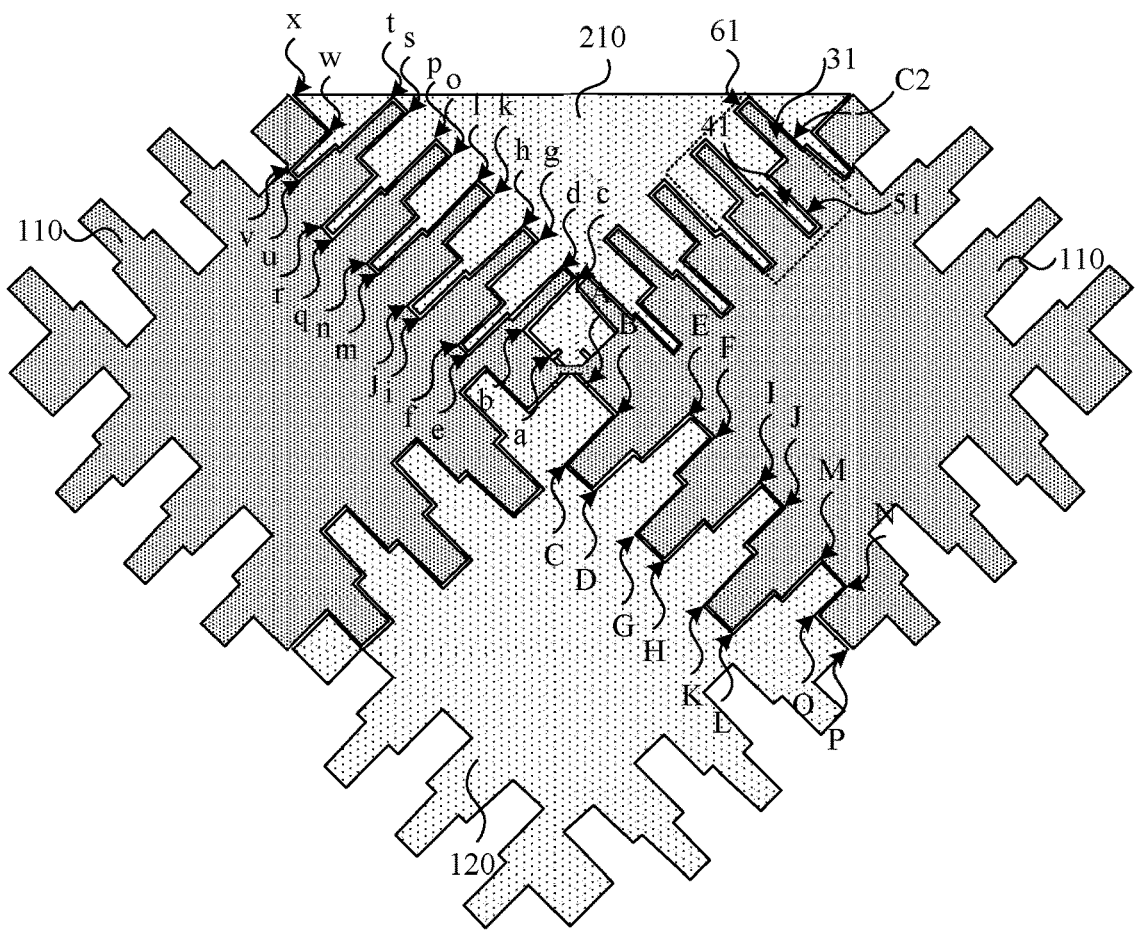
FIG. 9 is a schematic diagram of another compensation boundary line according to an exemplary embodiment of the present disclosure.

FIG. 9 is a schematic diagram of another compensation boundary line according to an exemplary embodiment of the present disclosure, in which the first boundary electrode and the second boundary electrode are in the form of transparent electrodes. As shown in FIG. 9, the first region includes two first boundary electrodes 110 and one first non-boundary electrode 120, and the second region includes a second boundary electrode 210. The first boundary electrode 110 and the first non-boundary electrode 120 included in the first region are rhombus as designed, and thus, are electrodes with a flawless contour. The second region is located at the edge of the touch structure layer, and the shape of the second boundary electrode 210 is triangular, which is different from the designed shape of rhombus, and the contour thereof is notched about 50%.

In an exemplary embodiment, the first non-boundary electrode 120 of the first region is not adjacent to the second boundary electrode 210 of the second region but adjacent to the two first boundary electrodes 110 of the first region. For the first non-boundary electrode 120 and adjacent first boundary electrode 110, protrusions and grooves are provided on the side of the first non-boundary electrode 120 and first boundary electrode 110 so that a polyline boundary line is formed between the first non-boundary electrode 120 and the first boundary electrode 110. The structures of the protrusions and grooves provided on the first non-boundary electrode 120 and the first boundary electrode 110 are similar to those in FIG. 7. In the exemplary embodiment of the present disclosure, a protrusion provided on the first non-boundary electrode 120 is referred to as a reference protrusion and a groove provided on the first non-boundary electrode 120 is referred to as a reference groove. In an exemplary embodiment, the first non-boundary electrode 120 is provided with three reference protrusions and three reference grooves. In an exemplary embodiment, the length of the boundary line formed between the first non-boundary electrode 120 and the first boundary electrode 110 is the length of line segment AB+length of line segment BC+length of line segment CD+length of line segment DE+length of line segment EF+length of line segment FG+length of line segment GH+length of line segment HI+length of line segment IJ+length of line segment JK+length of line segment KL+length of line segment LM+length of line segment MN+length of line segment NO+length of line segment OP.

In the exemplary embodiment, the second boundary electrode 210 of the second region is adjacent to the two first boundary electrodes 110 of the first region to form two boundary lines, i.e. one boundary line is formed by one side of the second boundary electrode 210 and a side of one first boundary electrode 110, the other boundary line is formed by the other side of the second boundary electrode 210 and a side of the other first boundary electrode 110. In an exemplary embodiment, a side of the first boundary electrode 110 is referred to as a first side, and a side of the second boundary electrode 210 is referred to as a second side.

In an exemplary embodiment, the compensation structure may include a plurality of first protrusions 31 and a plurality of first grooves 51 provided on a first side, and a plurality of second protrusions 41 and a plurality of second grooves 61 provided on a second side. In an exemplary embodiment, the structures of the plurality of first protrusions 31 and the plurality of first grooves 51 provided on the first side are similar to the first protrusions and first grooves in FIG. 7; and the structures of the plurality of second protrusions 41 and the plurality of second grooves 61 provided on the second side are similar to the second protrusions and the second grooves in FIG. 7.

In an exemplary embodiment, the quantity of first protrusions 31 provided on the first side of the first boundary electrode 110 is greater than the quantity of reference protrusions provided on the side of the first non-boundary electrode 120.

In an exemplary embodiment, the quantity of first grooves 51 provided on the first side of the first boundary electrode 110 is greater than the quantity of reference grooves provided on the side of the first non-boundary electrode 120.

FIG. 9 takes the compensation boundary line formed between the left first boundary electrode 110 and the second boundary electrode 210 as an example. The quantity of the first protrusions 31 provided on the first side of the first boundary electrode 110 is 5, greater than that of the reference protrusions arranged in the first boundary electrode 110 which is 3; the quantity of the first grooves 51 provided on the first side of the first boundary electrode 110 is 5, greater than that of the reference grooves which is 3 arranged in first boundary electrode 110. Accordingly, the quantity of the second protrusions 41 and that of the second grooves 61 provided on the second side of the second boundary electrode 210 are both 5, greater than that of the reference protrusions and that of the reference grooves which are 3.

In an exemplary embodiment, the compensation boundary formed between the first protrusion 31 and the first groove 51 of the first boundary electrode 110 and the second protrusion 41 and the second groove 61 of the second boundary electrode 210 includes the following line segments: line segment ab, line segment bc, line segment cd, line segment de, line segment ef, line segment fg, line segment gh, line segment hi, line segment ij, line segment jk, line segment kl, line segment lm, line segment mn, line segment no and line segment op, line segment pq, line segment qr, line segment rs, line segment st, line segment tu, line segment uv, line segment vw and line segment wx, so that the length L of the compensation boundary line between the first boundary electrode 110 and the second boundary electrode 210 is the sum of the lengths of these line segment, i.e. L, length of compensation boundary line=length of line segment ab+length of line segment bc+length of line segment cd+length of line segment de+length of line segment ef+length of line segment fg+length of line segment gh+length of line segment hi+length of line segment ij+length of line segment jk+length of line segment kl+length of line segment lm+length of line segment mn+length of line segment no+length of line segment op+length of line segment pq+length of line segment qr+length of line segment rs+length of line segment st+length of line segment tu+length of line segment uv+length of line segment vw+length of line segment wx. Since the quantity of the first protrusions 31 and that of the first grooves 51 are larger than that of the reference protrusions and that of the reference grooves respectively, length L of the compensation boundary line between the first boundary electrode 110 and the second boundary electrode 210 is greater than the length $L_0$ of the reference boundary line, the difference between the length L of the compensation boundary line and the length $L_0$ of the reference boundary line is about the sum of the lengths of the line segments no, pq, rs and tu.

The exemplary embodiment of the present disclosure increases the length of the compensation boundary line between the first boundary electrode and the second boundary electrode and the contact area between the first boundary electrode and the second boundary electrode, thus improving the mutual capacitance values and tolerance values of touch electrodes with a notched contour so that the mutual capacitance values and tolerance values of touch electrodes with a notched contour approach those of touch electrodes with a flawless contour, which enhances the uniformity of touch performance and touch performance.

In an exemplary embodiment, when the quantity of first protrusions 31 provided on the first side of the first boundary electrode 110 is greater than that of the reference protrusions provided on the side of the first non-boundary electrode 120, the height of the first protrusions may be equal to that of the reference protrusions and the width of the first protrusions may be smaller than that of the reference protrusions. In some possible implementations, the height of a first protrusion may be smaller than that of a reference protrusion when it is ensured that the length of the compensation boundary line is greater than that of the reference boundary line.

In an exemplary embodiment, when the quantity of first grooves 51 provided on the first side of the first boundary electrode 110 is greater than the quantity of reference grooves provided on the side of the first non-boundary electrode 120, the depth of the first grooves may be equal to that of the reference grooves and the width of the first grooves may be smaller than that of the reference grooves. In some possible implementations, the depth of a first grooves may be smaller than that of a reference grooves when it is ensured that the length of the compensation boundary line is greater than that of the reference boundary line.

In an exemplary embodiment, when the quantity of first protrusions 31 provided on the first side of the first boundary electrode 110 is equal to the quantity of reference protrusions provided on the side of the first non-boundary electrode 120, the length of the compensation boundary line may be made larger than that of the reference boundary line by configuring the height of the first protrusions to be greater than that of the reference protrusions.

In an exemplary embodiment, when the quantity of first grooves 51 provided on the first side of the first boundary electrode 110 is equal to the quantity of reference grooves provided on the side of the first non-boundary electrode 120, the length of the compensation boundary line may be made larger than that of the reference boundary line by configuring the depth of the first grooves to be greater than that of the reference grooves.

In an exemplary embodiment, it may be configured that the quantity of the first protrusions is greater than that of the reference protrusions, and the height of the first protrusions is greater than that of the reference protrusions. It may be configured that the quantity of the first grooves is greater than that of the reference grooves, and the depth of the first grooves is greater than that of the reference grooves.

In an exemplary embodiment, the length of a compensation boundary line between a first boundary electrode and a second boundary electrode can be adjusted by adjusting the quantity of the first protrusions, the quantity of the first grooves, the height of the first protrusions and the depth of the first grooves arranged on the first side, so that the mutual capacitance values and tolerance values of touch electrodes with a notched contour can be adjusted, and the mutual capacitance values and tolerance values of touch electrodes with a notched contour are approaching the same as those of touch electrodes with a flawless contour.

Figure 10:
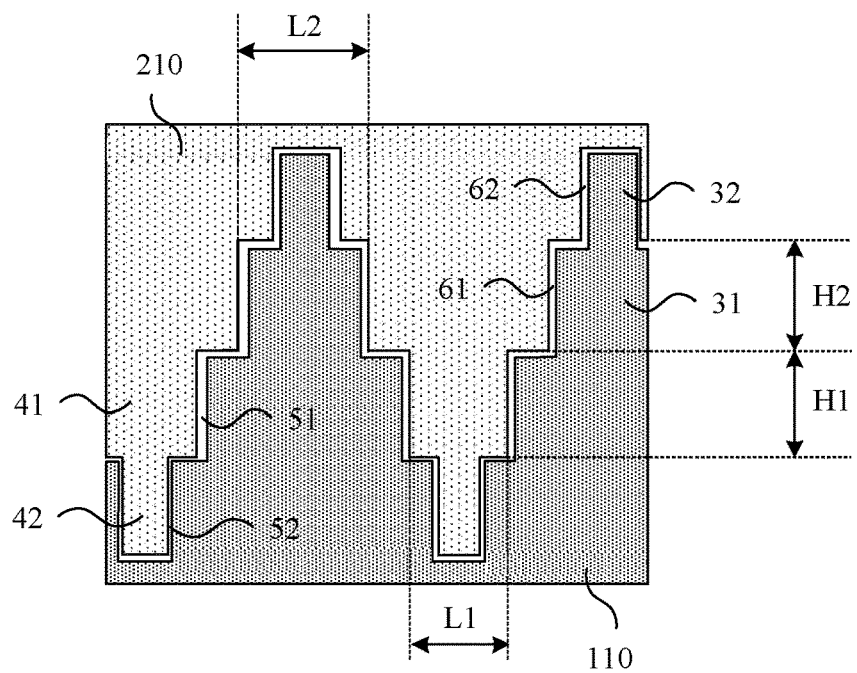
FIG. 10 is a schematic diagram of another compensation structure according to an exemplary embodiment of the present disclosure.

FIG. 10 is a schematic diagram of another compensation structure according to an exemplary embodiment of the present disclosure and is an enlarged view of region C2 in FIG. 9. As shown in FIG. 10, the first side of the first boundary electrode 110 is provided with a first protrusion 31 and a first groove 51 and the second side of the second boundary electrode 210 is provided with a second protrusion 41 and a second groove 61. In an exemplary embodiment, the first protrusion 31 is further provided with a third protrusion 32; the first groove 51 is further provided with a third groove 52 inside; the second protrusion 41 is further provided with a fourth protrusion 42; and the second groove 61 is further provided with a fourth groove 62 inside.

In an exemplary embodiment, the first protrusion 31, the second protrusion 41, the first groove 51 and the second groove 61 have the same rectangular shape; the third protrusion 32, the fourth protrusion 42, the third groove 52 and the fourth groove 62 have the same rectangular shape. The first protrusion 31 is arranged in the second groove 61; the third protrusion 32 is arranged in the fourth groove 62; the second protrusion 41 is arranged in the first groove 51; the fourth protrusion 42 is arranged in the third groove 52 so that the first boundary electrode 110 and the second boundary electrode 210 interdigitate and the sides of the first boundary electrode 110 and the second boundary electrode 210 are engaged with each other to form a polyline compensation boundary line. In an exemplary embodiment, the first protrusion 31 and the second protrusion 41 have the same height and width; the first groove 51 and the second groove 61 have the same depth and width; the third protrusion 32 and the fourth protrusion 42 have the same height and width; and the third groove 52 and the fourth groove 62 have the same depth and width.

In an exemplary embodiment, the width of the third protrusion 32 may be ⅕ to ⅔ of the width L1 of the first protrusion 31; the width of the fourth protrusion 42 may be ⅕ to ⅔ of the width L1 of the second protrusion 41; the width of the third groove 52 may be ⅕ to ⅔ of width L2 of the first groove 51; and the width of the fourth groove 62 may be ⅕ to ⅔ of the width L2 of the second groove 61.

In an exemplary embodiment, the height of the third protrusion 32 may be ½ to ⅔ of the height H1 of the first protrusion 31; the height of the fourth protrusion 42 may be ½ to ⅔ of the height H1 of the second protrusion 41; the depth of the third groove 52 may be ½ to ⅔ of depth H2 of the first groove 51; and the depth of the fourth groove 62 may be ½ to ⅔ of the depth H2 of the second groove 61.

In an exemplary embodiment, the third protrusion 32 may be disposed in the middle of the first protrusion 31, and the fourth groove 62 may be disposed in the middle of the second groove 61. Alternatively, the third protrusion 32 may be disposed on a side of the first protrusion 31, and the fourth groove 62 may be disposed in a side of the second groove 61.

In an exemplary embodiment, the fourth protrusion 42 may be disposed in the middle of the second protrusion 41, and the third groove 52 may be disposed in the middle of the first groove 51. Alternatively, the position of the fourth protrusion 42 may be disposed on a side of the second protrusion 41, and the position of the third groove 52 may be disposed in a side of the first groove 51.

In an exemplary embodiment, the height of a first protrusion may be equal to the height of a reference protrusion and the depth of a second groove may be equal to the depth of a reference groove. So that the third protrusion and the fourth groove provided by the exemplary embodiment of the present disclosure increase the length of the compensation boundary line between the first boundary electrode and the second boundary electrode.

In an exemplary embodiment, the height of a second protrusion may be equal to that of a reference protrusion, and the depth of a first groove may be equal to that of a reference groove. In this way, the fourth protrusion and the third groove provided by the exemplary embodiment of the present disclosure increase the length of the compensation boundary line between the first boundary electrode and the second boundary electrode.

In an exemplary embodiment, each first protrusion 31 may be provided with 1 to 3 third protrusions 32; each first groove 51 may be provided with 1 to 3 third grooves 52; each second protrusion 41 may be provided with 1 to 3 fourth protrusions 42; and each second groove 61 may be provided with 1 to 3 fourth grooves 62.

Figure 11:
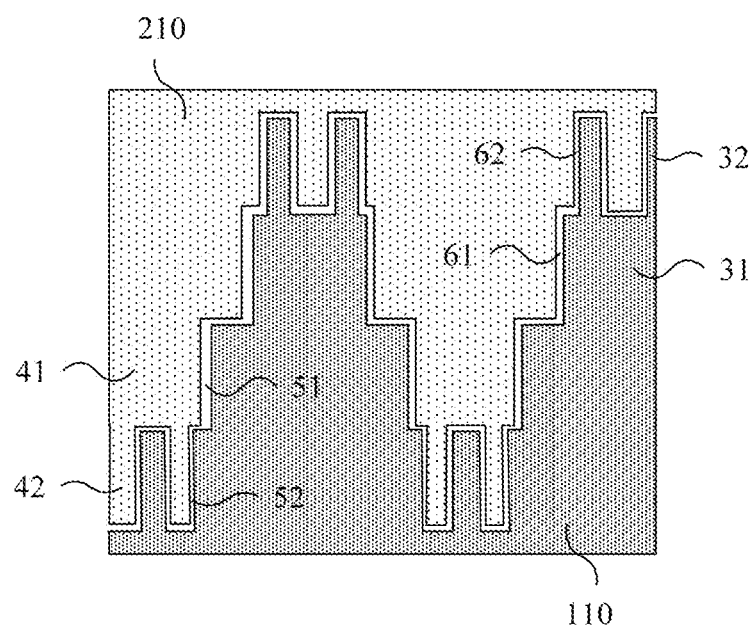
FIG. 11 is a schematic diagram of yet another compensation structure according to an exemplary embodiment of the present disclosure.

FIG. 11 is a schematic diagram of another compensation structure according to an exemplary embodiment of the present disclosure, and is an enlarged view of region C2 in FIG. 9. As shown in FIG. 11, the first side of the first boundary electrode 110 is provided with a first protrusion 31 and a first groove 51 and the second side of the second boundary electrode 210 is provided with a second protrusion 41 and a second groove 61. In an exemplary embodiment, the first protrusion 31 is further provided with two third protrusions 32; the first groove 51 is further provided with two third grooves 52; the second protrusion 41 is further provided with two fourth protrusion 42; and the second groove 61 is further provided with two fourth grooves 62 so that an interdigital compensation boundary line is formed between the first boundary electrode and the second boundary electrode.

In an exemplary embodiment, the quantities and geometric dimensions of the first protrusions and those of the first grooves may be configured to be the same as the quantities and geometric dimensions of the reference protrusions and those of the reference grooves, respectively. The length of the compensation boundary line between the first boundary electrode and the second boundary electrode may be adjusted by adjusting the quantities and geometric dimensions of the third protrusions and the fourth protrusions so that the mutual capacitance values and tolerance values of touch electrodes with a notched contour can be adjusted to approach those of touch electrodes with a flawless contour.

Although FIG. 8 and FIG. 10 take that the boundary electrode is in the form of a transparent electrode as example for illustration, the present disclosure is not limited to the structure. In an exemplary embodiment, the first boundary electrode and the second boundary electrode may take the form of metal mesh.

Although the foregoing exemplary embodiments have been described with the upper edge of the touch structure layer taken as an example, the present disclosure is not limited to the upper edge of the touch structure layer. In an exemplary embodiment, the touch electrode with a notched contour may be disposed at the lower edge, left edge, right edge, four corners or around the mounting hole in the touch structure layer.

Figures 1, 12:
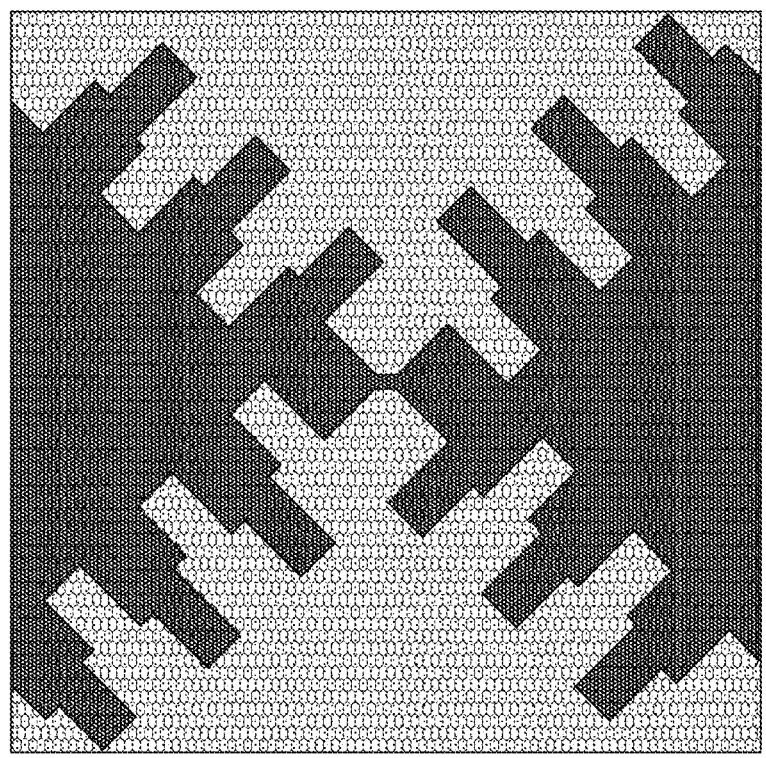
Figures 2, 12:
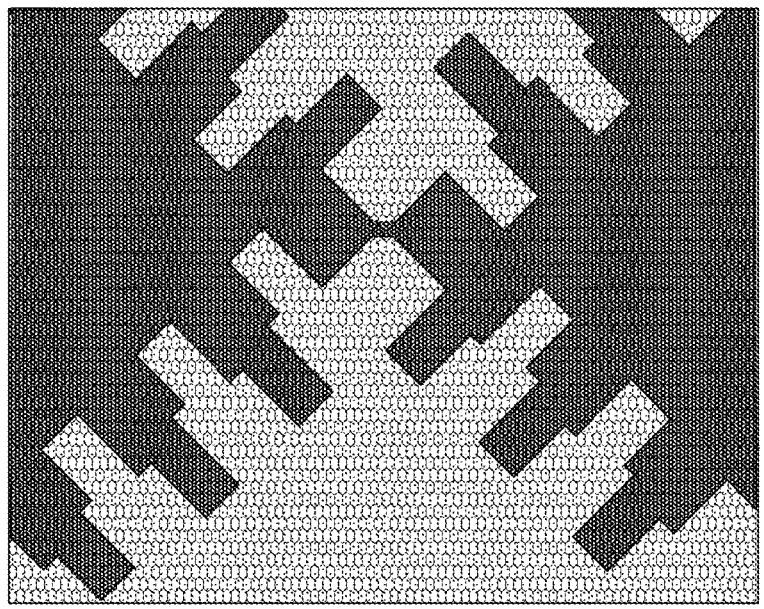
Figures 3, 12:
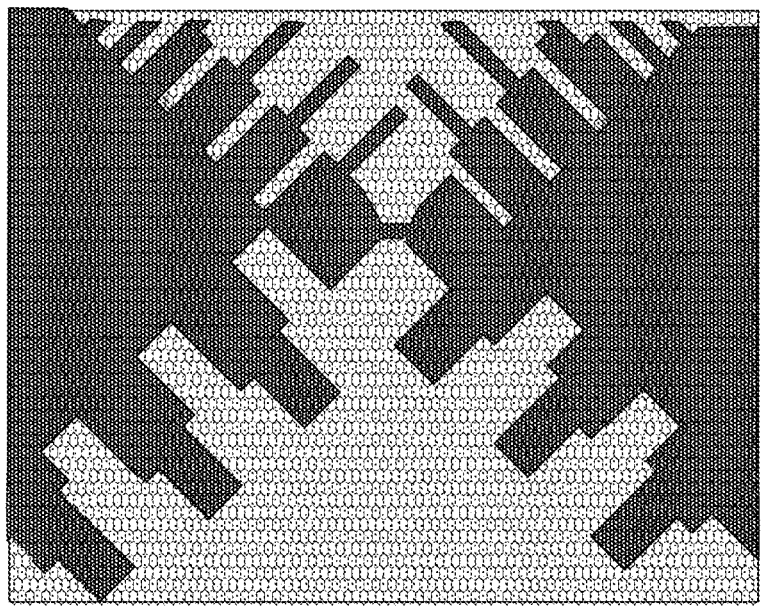

FIG. 12-1 is a schematic diagram of a touch electrode for simulation test according to an exemplary embodiment of the present disclosure, in which the driving electrode and the sensing electrode are in the form of metal mesh. As shown in FIG. 12-1, the four touch electrodes include two driving electrodes with a flawless contour and two sensing electrodes with a flawless contour. The simulation results show that for the touch electrodes with a flawless contour, when there is no finger touch, the mutual capacitance value Cm between the driving electrodes and the sensing electrodes is about 0.991 pF; when there is a finger touch, the mutual capacitance value Cm' between the driving electrodes and the sensing electrode is about 0.932 pF; the tolerance value ΔCm of touch electrodes with a flawless contour is about 0.059 pF.

FIG. 12-2 is a schematic diagram of another touch electrode for simulation test according to an exemplary embodiment of the present disclosure, in which the driving electrodes and the sensing electrodes are in the form of metal mesh. As shown in FIG. 12-2, the four touch electrodes include one driving electrode with a notched contour, one driving electrode with a flawless contour and two sensing electrodes with a flawless contour, the driving electrode with a notched contour being disposed at an edge and not being designed with a compensation structure. The simulation results show that for touch electrodes with a notched contour, when there is no finger touch, the mutual capacitance value Cm between the driving electrodes and the sensing electrodes is about 0.847 pF; when there is a finger touch, the mutual capacitance value Cm' between the driving electrodes and the sensing electrode is about 0.794 pF; the tolerance value ΔCm of touch electrodes with a flawless contour is about 0.053 pF. Therefore, the notched contour of a touch electrode will cause a reduction in its mutual capacitance value and in its tolerance value.

FIG. 12-3 is a schematic diagram of another touch electrode for simulation test according to an exemplary embodiment of the present disclosure, in which the driving electrode and the sensing electrode are in the form of metal mesh. As shown in FIG. 12-3, the four touch electrodes include one driving electrode with a notched contour, one driving electrode with a flawless contour and two sensing electrodes with a flawless contour, the driving electrode with a notched contour being disposed at the edge and being designed with the technical scheme proposed in this disclosure. The sides of touch electrodes with a flawless contour is provided with reference protrusions and reference grooves while the sides of the touch electrode with a notched contour are provided with first protrusions and first grooves. The quantity of first protrusions is greater than that of reference protrusions and the quantity of first grooves is greater than that of reference grooves, which increases the contact area between the driving electrodes and the sensing electrodes. The simulation results show that for touch electrodes with a notched contour but configured with compensation, when there is no finger touch, the mutual capacitance value Cm between the driving electrodes and the sensing electrodes is improved to about 0.986 pF; when there is a finger touch, the mutual capacitance value Cm' between the driving electrodes and the sensing electrode is improved to about 0.927 pF; the tolerance value ΔCm of touch electrodes with a flawless contour is compensated to about 0.059 pF. Therefore, after compensation, the mutual capacitance values and tolerance values of touch electrodes with a notched contour are similar to those of touch electrodes with a flawless contour, and the compensation effect is obvious.

The exemplary embodiment of the present disclosure also carries out a simulation test on the compensation design of corner areas, and the simulation results show that even for corner areas where the touch electrode has a serious notched contour, the mutual capacitance value and tolerance value of touch electrodes after compensation decrease slightly, representing an obvious improvement compared with those before compensation.

To sum up, the compensation structure of the exemplary embodiments of the present disclosure can keep the mutual capacitance values and tolerance values of touch electrodes with a notched contour consistent with those of touch electrodes with a flawless contour, which greatly improves the touch performance of edges, corners, mounting holes and other areas and thus improves the touch uniformity and touch performance.

The touch display panel provided in the present disclosure may be any product or component with a display function such as a mobile phone, a tablet computer, a television, a display device, a notebook computer, a digital photo frame, or a navigator, etc.

The present disclosure also provides a touch structure, which comprises a first region and a second region, wherein the touch electrodes of the first region are touch electrodes with a flawless contour, and the touch electrodes of the second region are touch electrodes with a notched contour. Touch electrodes of the first region include at least one first boundary electrode which is adjacent to the touch electrodes of the second region and at least one first non-boundary electrode which is not adjacent to the touch electrodes of the second region. Touch electrodes of the second region include at least one second boundary electrode which is adjacent to the first boundary electrode.

The first boundary electrode includes a first side adjacent to the second boundary electrode, and the second boundary electrode includes a second side adjacent to the first boundary electrode. The first side and the second side are provided with a compensation structure which is configured to form a compensation boundary line between the first side and the second side, a length of the compensation boundary line being greater than a length of a reference boundary line. The reference boundary line is a boundary line formed between one side of a first non-boundary electrode and one side of a touch electrode adjacent to the first non-boundary electrode.

In some possible implementations, the compensation structure includes a first protrusion provided on the first side and a second groove provided on the second side, wherein the first protrusion is arranged in the second groove so that the first side and the second side form a polyline compensation boundary line.

Alternatively, the compensation structure includes a first groove provided on the first side and a second protrusion provided on the second side, wherein the second protrusion is arranged in the first groove so that the first side and the second side form a polyline compensation boundary line.

Alternatively, the compensation structure includes a first protrusion and a first groove provided on the first side and a second protrusion and a second groove provided on the second side, wherein the first protrusion is arranged in the second groove while the second protrusion is arranged in the first groove so that the first side and the second side form a polyline compensation boundary line.

In some possible implementations, the first protrusion is arranged between adjacent first grooves, and the second protrusion is arranged between adjacent second grooves.

In some possible implementations, the width of the first protrusion is ⅕ to ⅔ of the distance between adjacent second grooves, and the width of the second protrusion is ⅕ to ⅔ of the distance between adjacent first grooves.

In some possible implementations, the quantity of first protrusions on the first side is 1 to 5; the quantity of first grooves on the first side is 1 to 5; the quantity of second protrusions on the second side is 1 to 5; and the quantity of second grooves on the second side is 1 to 5.

In some possible implementations, the shape of the first protrusion, the second protrusion, the first groove and the second groove include any one or more of the following: a triangle, a rectangle, a trapezoid, a semi-circle and a semi-ellipse.

In some possible implementations, the side of the first non-boundary electrode and the side of the adjacent touch electrode are provided with a reference protrusion, a reference groove, or a reference protrusion and a reference groove to form a polyline reference boundary line.

In some possible implementations, the quantity of first protrusions provided on the first side of the first boundary electrode is greater than the quantity of reference protrusions provided on the side of the first non-boundary electrode. Alternatively, the quantity of first grooves provided on the first side of the first boundary electrode is greater than the quantity of reference grooves provided on the side of the first non-boundary electrode. Alternatively, the quantity of first protrusions and the quantity of first grooves provided on the first side of the first boundary electrode are respectively larger than the quantity of reference protrusions and the quantity of reference grooves provided on the side of the first non-boundary electrode.

In some possible implementations, the height of the first protrusion of the first boundary electrode is greater than that of the reference protrusion of the first non-boundary electrode. Alternatively, the depth of the first groove of the first boundary electrode is greater than that of the reference groove of the first non-boundary electrode. Alternatively, the height of the first protrusion and the depth of the first groove of the first boundary electrode are respectively larger than the height of the reference protrusion and the depth of the reference groove of the first non-boundary electrode.

In some possible implementations, at least one third protrusion is provided on the first protrusion of the first boundary electrode while at least one fourth groove is provided in the second groove of the second boundary electrode, the third protrusion being disposed in the fourth groove.

Alternatively, at least one third groove is provided in the first groove of the first boundary electrode while at least one fourth protrusion is provided on the second protrusion of the second boundary electrode, the fourth protrusion being disposed in the third groove.

Alternatively, at least one third protrusion is provided on the first protrusion of the first boundary electrode and at least one third groove is provided in the first groove of the first boundary electrode; while at least one fourth protrusion is provided on the second protrusion of the second boundary electrode and at least one fourth groove is provided in the second groove of the second boundary electrode, the third protrusion being disposed in the fourth groove while the fourth protrusion being disposed in the third groove.

In some possible implementations, the width of the third protrusion is ⅕ to ⅔ of that of the first protrusion; the width of the fourth protrusion is ⅕ to ⅔ of that of the second protrusion; the width of the third groove is ⅕ to ⅔ of that of the first groove; and the width of the fourth groove is ⅕ to ⅔ of that of the second groove L2.

In some possible implementations, each first protrusion is provided with 1 to 3 third protrusions; each first groove is provided with 1 to 3 third grooves; each second protrusion is provided with 1 to 3 fourth protrusions; and each second groove is provided with 1 to 3 fourth grooves.

In an exemplary embodiment, the touch structure includes a bridge layer, an insulating layer and a touch layer which are in a stacked arrangement. The touch layer includes a plurality of first touch electrodes and a plurality of first connecting parts arranged alternatively and connected successively along a first direction and a plurality of second touch electrodes arranged at intervals along a second direction. The bridge layer includes connecting bridges connected with adjacent second touch electrodes. The first direction intersects the second direction.

In some possible implementations, the first touch electrode and the second touch electrode are transparent electrodes or metal meshes.

In some possible implementations, the first boundary electrode is a first touch electrode and the second boundary electrode is a second touch electrode; alternatively, the first boundary electrode is a second touch electrode, and the second boundary electrode is a first touch electrode.

The drawings in the present disclosure only refer to the structures involved in the present disclosure, and common designs may be referred to for other structures. The embodiments of the present disclosure, i.e., the features in the embodiments may be combined with each other to obtain a new embodiment where there is no conflict.

Those of ordinary skills in the art should understand that modifications or equivalent substitutions may be made to the technical solutions of the present disclosure without departing from the spirit and scope of the technical solutions of the present disclosure, all of which should be contained within the scope of the claims of the present disclosure.

What we claim is:

1. A touch structure, comprising: a first region and a second region, wherein
   touch electrodes in the first region are touch electrodes with a flawless contour, and touch electrodes in the second region are touch electrodes with a notched contour; the touch electrodes in the first region comprise at least one first boundary electrode which is adjacent to the touch electrodes in the second region and at least one first non-boundary electrode which is not adjacent to the touch electrodes in the second region; the touch electrodes in the second region comprise at least one second boundary electrode which is adjacent to the first boundary electrode;
   the first boundary electrode comprises a first side, the first side is adjacent to the second boundary electrode, and the second boundary electrode comprises a second side, the second side is adjacent to the first boundary electrode; the first side and the second side are provided respectively with a compensation structure which is configured to form a compensation boundary line between the first side and the second side, a length of the compensation boundary line being greater than a length of a reference boundary line, the reference boundary line is a boundary line formed between one side of a first non-boundary electrode and one side of a touch electrode adjacent to the first non-boundary electrode,
   wherein, a length difference between the length of the compensation boundary line and the length of the reference boundary line is adjusted to make mutual capacitance values and tolerance values of the touch electrodes with the notched contour approaching the same as those of touch electrodes with the flawless contour to enhance uniformity of touch performance.

2. The touch structure according to claim 1, wherein
   the compensation structure comprises a first protrusion provided on the first side and a second groove provided on the second side, wherein the first protrusion is arranged in the second groove to allow the first side and the second side to form a polyline compensation boundary line; or
   the compensation structure comprises a first groove provided on the first side and a second protrusion provided on the second side, wherein the second protrusion is arranged in the first groove to allow the first side and the second side to form a polyline compensation boundary line; or the compensation structure comprises a first protrusion and a first groove provided on the first side and a second protrusion and a second groove provided on the second side, wherein the first protrusion is arranged in the second groove while the second protrusion is arranged in the first groove to allow the first side and the second side to form a polyline compensation boundary line.

3. The touch structure according to claim 2, wherein the first protrusion is arranged between adjacent first grooves and the second protrusion is arranged between adjacent second grooves.

4. The touch structure according to claim 3, wherein a width of the first protrusion is 1/5 to 2/3 of a distance between adjacent second grooves, and a width of the second protrusion is 1/5 to 2/3 of a distance between adjacent first grooves.

5. The touch structure according to claim 2, wherein a quantity of first protrusions on the first side is 1 to 5, a quantity of first grooves on the first side is 1 to 5, a quantity of second protrusions on the second side is 1 to 5, and a quantity of second grooves on the second side is 1 to 5.

6. The touch structure according to claim 2, wherein a shape of the first protrusion, the second protrusion, the first groove and the second groove comprises any one or more of a triangle, a rectangle, a trapezoid, a semi-circle and a semi-ellipse.

7. The touch structure according to claim 1, wherein the side of the first non-boundary electrode and the side of the adjacent touch electrode are provided with reference protrusions or reference grooves, or with reference protrusions and reference grooves to form a polyline reference boundary line, wherein the reference protrusions are protrusions provided on the first non-boundary electrode and the reference grooves are grooves provided on the first non-boundary electrode.

8. The touch structure according to claim 7, wherein a quantity of first protrusions arranged on the first side of the first boundary electrode is greater than a quantity of reference protrusions arranged on the side of the first non-boundary electrode; or, a quantity of first grooves arranged on the first side of the first boundary electrode is greater than a quantity of reference grooves arranged on the side of the first non-boundary electrode; or, a quantity of first protrusions and a quantity of first grooves arranged on the first side of the first boundary electrode are respectively larger than a quantity of reference protrusions and a quantity of reference grooves arranged on the side of the first non-boundary electrode.

9. The touch structure according to claim 7, wherein a height of a first protrusion of the first boundary electrode is greater than a height of the reference protrusion of the first non-boundary electrode; or, a depth of a first groove of the first boundary electrode is greater than a depth of the reference groove of the first non-boundary electrode; or, a height of a first protrusion and a depth of a first groove of the first boundary electrode are respectively greater than a height of the reference protrusion and a depth of the reference groove of the first non-boundary electrode.

10. The touch structure according to claim 7, wherein
at least one third protrusion is provided on a first protrusion of the first boundary electrode and at least one fourth groove is provided in a second groove of the second boundary electrode, the third protrusion being arranged in the fourth groove; or at least one third groove is provided in a first groove of the first boundary electrode and at least one fourth protrusion is provided on a second protrusion of the second boundary electrode, the fourth protrusion being arranged in the third groove; or at least one third protrusion is provided on a first protrusion of the first boundary electrode and at least one third groove is provided in a first groove of the first boundary electrode and at least one fourth protrusion is provided on a second protrusion of the second boundary electrode and at least one fourth groove is provided in a second groove of the second boundary electrode, the third protrusion being disposed in the fourth groove while the fourth protrusion being arranged in the third groove.

11. The touch structure according to claim 10, wherein a width of the third protrusion is 1/5 to 2/3 of a width of the first protrusion, a width of the fourth protrusion is 1/5 to 2/3 of a width of the second protrusion, a width of the third groove is 1/5 to 2/3 of a width of the first groove, and a width of the fourth groove is 1/5 to 2/3 of a width of the second groove.

12. The touch structure according to claim 10, wherein each first protrusion is provided with 1 to 3 third protrusions, each first groove is provided with 1 to 3 third grooves, each second protrusion is provided with 1 to 3 fourth protrusions, and each second groove is provided with 1 to 3 fourth grooves.

13. The touch structure according to claim 1, wherein the touch structure comprises a bridge layer, an insulating layer and a touch layer which are in a stacked arrangement, wherein the touch layer comprises a plurality of first touch electrodes and a plurality of first connecting parts arranged alternatively and connected successively along a first direction and a plurality of second touch electrodes arranged at intervals along a second direction, the bridge layer comprises connecting bridges connected with adjacent second touch electrodes, the first direction intersecting the second direction.

14. The touch structure according to claim 13, wherein the first boundary electrode is a first touch electrode and the second boundary electrode is a second touch electrode; or the first boundary electrode is a second touch electrode, and the second boundary electrode is a first touch electrode.

15. The touch structure according to claim 14, wherein the first touch electrode and the second touch electrode are transparent electrodes or metal mesh units.

16. A touch display panel, comprising:
a substrate, a display structure layer disposed on the substrate, and a touch structure layer disposed on the display structure layer, wherein
the touch structure layer comprises the following touch structure:
the touch structure comprises a first region and a second region, touch electrodes in the first region are touch electrodes with a flawless contour, and touch electrodes in the second region are touch electrodes with a notched contour; the touch electrodes in the first region comprise at least one first boundary electrode which is adjacent to the touch electrodes in the second region and at least one first non-boundary electrode which is not adjacent to the touch electrodes in the second region; the touch electrodes in the second region comprise at least one second boundary electrode which is adjacent to the first boundary electrode;
the first boundary electrode comprises a first side, the first side is adjacent to the second boundary electrode, and the second boundary electrode comprises a second side, the second side is adjacent to the first boundary electrode; the first side and the second side are provided respectively with a compensation structure which is configured to form a compensation boundary line between the first side and the second side, a length of the compensation boundary line being greater than a length of a reference boundary line, the reference boundary line is a boundary line formed between one side of a first non-boundary electrode and one side of a touch electrode adjacent to the first non-boundary electrode, wherein, a length difference between the length of the compensation boundary line and the length of the reference boundary line is adjusted to make mutual capacitance values and tolerance values of the touch electrodes with the notched contour approaching the same as those of touch electrodes with the flawless contour to enhance uniformity of touch performance; and the second region is disposed corresponding to any one or more of the following positions in the display structure layer: edge region, corner region and mounting hole region.

17. The touch display panel according to claim 16, wherein the compensation structure comprises a first protrusion provided on the first side and a second groove provided on the second side, wherein the first protrusion is arranged in the second groove to allow the first side and the second side to form a polyline compensation boundary line; or the compensation structure comprises a first groove provided on the first side and a second protrusion provided on the second side, wherein the second protrusion is arranged in the first groove to allow the first side and the second side to form a polyline compensation boundary line; or the compensation structure comprises a first protrusion and a first groove provided on the first side and a second protrusion and a second groove provided on the second side, wherein the first protrusion is arranged in the second groove while the second protrusion is arranged in the first groove to allow the first side and the second side to form a polyline compensation boundary line.

18. The touch display panel according to claim 16, wherein the side of the first non-boundary electrode and the side of the adjacent touch electrode are provided with a reference protrusion, a reference groove, or a reference protrusion and a reference groove to form a polyline reference boundary line, wherein the reference protrusion is a protrusion provided on the first non-boundary electrode and the reference groove is a groove provided on the first non-boundary electrode.

19. The touch display panel according to claim 16, wherein the touch structure comprises a bridge layer, an insulating layer and a touch layer which are in a stacked arrangement, wherein the touch layer comprises a plurality of first touch electrodes and a plurality of first connecting parts arranged alternatively and connected successively along a first direction and a plurality of second touch electrodes arranged at intervals along a second direction, the bridge layer comprises connecting bridges connected with adjacent second touch electrodes, the first direction intersecting the second direction.

* * * * *